US010472532B2

(12) United States Patent
Okamoto et al.

(10) Patent No.: US 10,472,532 B2
(45) Date of Patent: Nov. 12, 2019

(54) MAGENTA INK FOR INK-JET RECORDING

(71) Applicants: TOYO INK SC HOLDINGS CO., LTD., Tokyo (JP); TOYO INK CO., LTD., Tokyo (JP)

(72) Inventors: Mayuko Okamoto, Tokyo (JP); Yuji Kameyama, Tokyo (JP)

(73) Assignees: TOYO INK SC HOLDINGS CO., LTD., Tokyo (JP); TOYO INK CO., LTD., Tokyo (JP)

( * ) Notice: Subject to any disclaimer, the term of this patent is extended or adjusted under 35 U.S.C. 154(b) by 24 days.

(21) Appl. No.: 15/562,897

(22) PCT Filed: Mar. 30, 2016

(86) PCT No.: PCT/JP2016/060294
§ 371 (c)(1),
(2) Date: Sep. 29, 2017

(87) PCT Pub. No.: WO2016/159037
PCT Pub. Date: Oct. 6, 2016

(65) Prior Publication Data
US 2018/0079921 A1    Mar. 22, 2018

(30) Foreign Application Priority Data

Mar. 31, 2015 (JP) ................. 2015-072695

(51) Int. Cl.
| C09D 11/32 | (2014.01) |
| C09D 11/10 | (2014.01) |
| C09D 11/328 | (2014.01) |
| C09D 11/101 | (2014.01) |
| C09D 11/322 | (2014.01) |
| C09D 11/40 | (2014.01) |
| C09B 41/00 | (2006.01) |
| C09B 67/46 | (2006.01) |

(52) U.S. Cl.
CPC .......... C09D 11/328 (2013.01); C09B 41/005 (2013.01); C09B 67/0084 (2013.01); C09D 11/101 (2013.01); C09D 11/322 (2013.01); C09D 11/40 (2013.01)

(58) Field of Classification Search
CPC ... C09D 11/101; C09D 11/322; C09D 11/328; C09D 11/40; B41J 2/01; B41J 5/00; C09B 41/005; C09B 67/0084
See application file for complete search history.

(56) References Cited

U.S. PATENT DOCUMENTS

| 10,000,649 B2 * | 6/2018 | Okamoto ............. C09D 11/322 |
| 2005/0039632 A1 | 2/2005 | Yamamoto et al. |
| 2009/0030144 A1 | 1/2009 | Mizutani et al. |
| 2014/0063154 A1 | 3/2014 | Gould et al. |

FOREIGN PATENT DOCUMENTS

| JP | 2009024072 | 2/2009 |
| JP | 2009102661 | 5/2009 |
| JP | 2010521330 | 6/2010 |
| JP | 2010-195906 | 9/2010 |
| JP | 2010-241938 | 10/2010 |
| JP | 2013-047306 | 3/2013 |
| JP | 2014511288 | 5/2014 |
| JP | 2014-214255 | 11/2014 |
| WO | 2008043692 | 4/2008 |
| WO | 2008074589 | 6/2008 |
| WO | 2012133612 | 10/2012 |

OTHER PUBLICATIONS

"Search Report of European Counterpart Application," dated Jan. 9, 2018, p. 1-p. 4.
"International Search Report (Form PCT/ISA/210) of PCT/JP2016/060294," dated Jul. 5, 2016, with English translation thereof, pp. 1-4.
"Office Action of Japan Counterpart Application," dated Jul. 30, 2019, with English translation thereof, pp. 1-9.

* cited by examiner

Primary Examiner — Sanza L. McClendon
(74) Attorney, Agent, or Firm — JCIPRNET

(57) ABSTRACT

The present invention relates to a magenta ink for inkjet recording containing at least one pigment selected from the group consisting of C.I. Pigment Red 147, 150, 176, 266 and 269, in an amount of 0.5 to 10% by mass relative to the total mass of the ink. The present invention can provide a magenta ink that is comprehensively superior in terms of light resistance, color development and storage stability. The present invention can also provide an ink set having excellent light resistance and color development for each ink included in the ink set, and an inkjet recording method that uses the ink set.

11 Claims, No Drawings

MAGENTA INK FOR INK-JET RECORDING

CROSS-REFERENCE TO RELATED APPLICATION

This application is a 371 application of the international PCT application serial no. PCT/JP2016/060294, filed on Mar. 30, 2016, which claims the priority benefit of Japan application no. 2015-072695, filed on Mar. 31, 2015. The entirety of each of the above-mentioned patent applications is hereby incorporated by reference herein and made a part of this specification.

TECHNICAL FIELD

The present invention relates to a magenta ink used in an inkjet recording method, an ink set containing the magenta ink, and an inkjet recording method using the ink set.

BACKGROUND ART

The inkjet printing method is a printing method in which very fine liquid droplets of ink are jetted from an inkjet head and deposited onto a printing target substrate, thus forming images or text on the substrate, and has the characteristic feature of not requiring a printing plate. The electrophotographic method is also widely recognized as a printing method that does not require a printing plate. However, compared with the electrophotographic method, the inkjet printing method is superior from various perspectives, including the initial cost of the apparatus, the running costs during printing, the apparatus size, and the high-speed printing characteristics.

Conventionally, a wide variety of inks have been used for the inks used in inkjet printing methods, including solvent-based inks, aqueous inks and oil-based inks. However, in recent years, the demand for active energy ray-curable inkjet inks has been increasing. This is because active energy ray-curable inkjet inks offer the advantages of also being applicable to non-absorbent substrates such as plastics and glass, and being able to reduce environmental impact by reducing the amount of solvent volatilization. Particularly in the case of inkjet printing for industrial applications, additional factors such as the water resistance of the printed items, the energy required for drying the ink and the adhesion of ink components to the head as a result of ink drying are expected to accelerate the replacement of solvent-based inks and aqueous inks with active energy ray-curable inkjet inks.

Furthermore, in recent years, as the performance of inkjet heads has improved, the application of inkjet printing methods within other known printing markets such as offset printing has also become more likely. In existing printing markets, productivity is extremely important. However, in the signage market, multi-pass printing methods are used, and with this type of printing method, achieving the type of productivity desired in existing printing markets is difficult. Accordingly, in order to enable an inkjet printing method to be used in existing printing markets, a single pass printing method capable of high-speed printing is preferably used.

On the other hand, the printed items from existing printing markets typified by offset printing are printed using a multitude of special colors (such as orange, red, green, blue and violet), and therefore offer the advantage of having excellent color reproducibility. Accordingly, in order to enable the application of an inkjet printing method within an existing printing market, achieving excellent color reproducibility is very important. Moreover, it is desirable that the obtained printed items do not undergo discoloration during storage.

In the case of inkjet inks, Patent Documents 1 to 3 disclose that because the color reproducibility of the formed images varies considerably depending on the degree of color reproduction potential of the three colors of yellow, magenta and cyan, pigment selection is an extremely important factor.

In Patent Documents 1 and 2, the desired color gamut is ensured by appropriate pigment selection, but these documents relate to aqueous inkjet inks. The present invention relates to non-aqueous inkjet inks, and in non-aqueous inkjet inks, because the dispersion solvent medium is generally a non-aqueous solvent such as a polymerizable monomer, pigment dispersion in the solvent medium tends to be extremely difficult, meaning further improvements are desirable.

In Patent Document 3, a method for improving the color reproducibility in active energy ray-curable inkjet inks is investigated, in which a so-called solid solution containing unsubstituted quinacridone and 2,9-dichloroquinacridone mixed together within the same crystal is selected as the magenta pigment. However, quinacridone pigments have a problem in that they tend to suffer from inferior color development. Moreover, pigment dispersions using a solid solution have poor storage stability. In addition, active energy ray-curable inkjet inks that use a solid solution tend to exhibit slower curing rates, and therefore considering the current trend toward high-speed printing, the use of quinacridone solid solutions could be considered undesirable.

Furthermore, in order to reproduce the type of color development achievable with offset printing, using an ink set containing a plurality of special colors is simple, but this results in an increase in the apparatus costs due to an increase in the number of heads, which diminishes the low-cost effect that is one of the benefits of inkjet printing.

PRIOR ART DOCUMENTS

Patent Documents

Patent Document 1: JP 2009-024072 A
Patent Document 2: JP 2009-102661 A
Patent Document 3: WO 2008/043692

DISCLOSURE OF INVENTION

Problems Invention Aims to Solve

The present invention provides a magenta ink that is comprehensively superior in terms of light resistance, color development and storage stability. Further, the invention provides an ink set having excellent light resistance and color development for each ink included in the ink set, and an inkjet recording method that uses the ink set.

Means for Solution of the Problems (1) One aspect of the present invention relates to a magenta ink for non-aqueous inkjet recording, containing at least one pigment selected from the group consisting of C.I. Pigment Red 147, 150, 176, 266 and 269, in an amount of 0.5 to 10% by mass relative to the total mass of the ink.
(2) Another aspect of the present invention relates to the magenta ink for non-aqueous inkjet recording described above, further containing a polymerizable monomer and a photopolymerization initiator.
(3) Yet another aspect of the present invention relates to the magenta ink for non-aqueous inkjet recording described above, wherein the polymerizable monomer contains at least one monomer selected from the group consisting of monofunctional (meth)acrylates and difunctional (meth)acrylates.
(4) Yet another aspect of the present invention relates to the magenta ink for non-aqueous inkjet recording described above, wherein the polymerizable monomer contains a polymerizable monomer having at least one of an ethylene oxide unit and a propylene oxide unit, in an amount of 70 to 100% by mass relative to the total mass of the polymerizable monomer.
(5) A separate aspect of the present invention relates to an ink set for non-aqueous inkjet recording, containing at least a magenta ink, a yellow ink and a cyan ink, wherein the magenta ink is the magenta ink for non-aqueous inkjet recording described above, and
the yellow ink contains at least one pigment selected from the group consisting of C.I. Pigment Yellow 150, 151, 180 and 185, in an amount of 1 to 10% by mass relative to the total mass of the yellow ink.
(6) Yet another aspect of the present invention relates to the ink set for non-aqueous inkjet recording described above, further containing at least one of an orange ink and a violet ink.
(7) Another separate aspect of the present invention relates to an inkjet recording method which uses the magenta ink for non-aqueous inkjet recording described above or the ink set for non-aqueous inkjet recording described above, the method including:
a discharge step of discharging the magenta ink for non-aqueous inkjet recording or an ink of the ink set for non-aqueous inkjet recording from an inkjet head onto a substrate, and
a step of curing the discharged ink by irradiation with active energy rays.

Effects of the Invention

Embodiments of the present invention are able to comprehensively improve the light resistance, color development and storage stability of a magenta ink. Further, other embodiments of the present invention are able to provide an ink set having excellent light resistance and color development for each ink included in the ink set, and an inkjet recording method that uses the ink set.

EMBODIMENTS FOR CARRYING OUT THE INVENTION

An inkjet ink according to an embodiment of the present invention is described below. In the following description, the inkjet ink is also referred to as simply "the ink".

Further, unless specifically stated otherwise, "parts" and "%" represent "parts by mass" and "% by mass" respectively.
<Inkjet Ink>
The inventors of the present invention recently discovered that in color inkjet recording methods, a magenta ink containing a specific pigment was capable of producing good images. Moreover, they also found that by using a combination of this magenta ink and specific color inks, images having good color balance could be obtained.

The magenta ink of an embodiment is comprehensively superior in terms of light resistance, color development and storage stability. Further, an inkjet ink set including the magenta ink exhibits excellent discoloration balance with the color inks other than the magenta ink, and can effectively prevent image deterioration over time.

The magenta ink of this embodiment is a non-aqueous inkjet ink, and in addition to the pigment, contains a non-aqueous medium, examples of which include organic compounds such as organic solvents and polymerizable monomers.

In those cases where the medium contains water, the water content is preferably less than 3% by mass, more preferably less than 2% by mass, and even more preferably less than 1% by mass, relative to the total mass of the ink. The water content can be measured by the Karl Fischer method.

The magenta ink of the present embodiment is preferably an active energy ray-curable inkjet ink.

In those cases where the magenta ink of the present embodiment is used as an active energy ray-curable inkjet ink, the ink also contains a polymerizable monomer and a photopolymerization initiator and the like.

There are no particular limitations on the so-called "active energy ray" in the present invention, provided it describes a form of active radiation which, upon irradiation, can impart the energy required to generate initiating species within the ink, and examples include a broad range of radiation types such as α-rays, -γ-rays, X-rays, ultraviolet (UV) rays, visible light rays and electron beams. Among these, from the viewpoints of curing sensitivity and the ease of availability of the irradiation device, ultraviolet rays and electron beams are preferred, and ultraviolet rays are particularly desirable. Accordingly, the inkjet ink of the present embodiment is preferably an ink composition that can be cured by irradiation with ultraviolet rays as the radiation.
<Magenta Ink Pigment>
From the viewpoints of color development and light resistance, examples of preferred pigments for inclusion in the magenta ink include C.I. Pigment Red 147, 150, 176, 266 and 269, and either one, or two or more, of these pigments may be used. In terms of achieving a combination of the best color development and light resistance, together with good storage stability, the use of C.I. Pigment 266 is particularly preferred.

By using these pigments, a magenta ink can be provided that exhibits superior color development and light resistance when compared with conventionally used quinacridone pigments. Moreover, compared with quinacridone pigments, the transmission efficiency of ultraviolet rays improves, which enhances the curability, and can also improve the adhesion of the ink to the substrate.

Further, when a color ink set containing a yellow ink and a cyan ink and the like in addition to the magenta ink of the present embodiment is used, favorable color reproducibility can be achieved.

The magenta pigment contained in the magenta ink preferably represents 0.1 to 10% by mass, more preferably 1 to 10% by mass, and even more preferably 2 to 7% by mass, of the total mass of the ink.

Besides magenta inks having the amount of pigment described above, the present invention does not necessarily exclude magenta inks having smaller amounts of the pigment as light magenta inks. For example, the pigment contained in a light magenta ink preferably represents 0.05 to 1% by mass, more preferably 0.2 to 1% by mass, and even more preferably 0.5 to 1% by mass, of the total mass of the ink.

Of the magenta pigments included in the magenta ink, C.I. Pigment Red 147, 150, 176, 266 and 269 preferably account for at least 60% by mass, more preferably at least 70% by mass, and even more preferably 90% by mass or more (including 100% by mass), of all of the magenta pigments. In those cases where the ink contains two or more of the above pigments, the total amount of the pigments preferably satisfies the above range.

In particular, C.I. Pigment 266 preferably accounts for at least 60% by mass, more preferably at least 70% by mass, and even more preferably 90% by mass or more (including 100% by mass), of all of the magenta pigments in the ink.

In some cases, it is particularly preferable to use only C.I. Pigment Red 266. Further, when the amount of C.I. Pigment Red 266 satisfies the above range, the transmission efficiency of ultraviolet rays is particularly good, and the curability and adhesion are also particularly superior.

In terms of the particle size of the magenta pigment, the D50 value measured by a laser diffraction method is preferably within a range from 50 to 500 nm, and more preferably from 100 to 400 nm, wherein the D50 value represents the particle size that means the number of particles having a particle size equal to or smaller than this value represents 50% of all of the particles. A particle size distribution that satisfies this range is superior in terms of color development, ink storage stability and ink discharge characteristics.

The particle size refers to the value obtained when the ink is diluted 200 to 1,000 fold with ethyl acetate, and the particle size is then measured using a dynamic light-scattering particle size distribution analyzer (MICROTRAC UPA150 manufactured by Nikkiso Co., Ltd.).

From the viewpoint of the desired levels of weather resistance and color development properties, a typically used magenta pigment may also be mixed with the magenta pigment if required.

Examples of magenta pigments that may be used in combination with the magenta pigment of the present invention include pigments having red or magenta coloring, and specific examples include:

monoazo-based pigments such as C.I. Pigment Red 3 (toluidine red) and 185, disazo pigments such as C.I. Pigment Red 38 (pyrazolone red B), azo lake pigments such as C.I. Pigment Red 53:1 (lake red C) and C.I. Pigment Red 57:1 (brilliant carmine 6B), condensed azo pigments such as C.I. Pigment Red 144 (condensed azo red BR), acidic dye lake pigments such as C.I. Pigment Red 174 (phloxine B lake), basic dye lake pigments such as C.I. Pigment Red 81 (rhodamine 6G' lake), anthraquinone pigments such as C.I. Pigment Red 177 (dianthraquinonyl red), thioindigo pigments such as C.I. Pigment Red 88 (thioindigo Bordeaux), perinone pigments such as C.I. Pigment Red 194 (perinone red), perylene pigments such as C.I. Pigment Red 149 (perylene scarlet), quinacridone pigments such as C.I. Pigment Violet 19 (unsubstituted quinacridone), C.I. Pigment Red 122 and C.I. Pigment Red 202 (quinacridone magenta), isoindolinone pigments such as C.I. Pigment Red 180 (isoindolinone red 2BLT), and alizarin lake pigments such as C.I. Pigment Red 83 (madder lake)', but this is not an exhaustive list. Among these, in terms of ink stability and color reproducibility and the like, quinacridone pigments are preferred.

Typically used yellow pigments, orange pigments and violet pigments and the like may also be mixed depending on the coloration desired. In particular, the pigments described below for use in yellow inks, orange inks and violet inks are preferred.

<Cyan Ink Pigment>

The cyan pigment included in the cyan ink is preferably a pigment having blue or cyan coloring, and specific examples include C.I. Pigment Blue 1, 2, 3, 15:3, 15:4, 15:34, 16, 22 and 60, and C.I. Vat Blue 4 and 60, and either one, or two or more, of these pigments may be used. Among these, phthalocyanine pigments are preferred, and including C.I. Pigment Blue 15:3 and/or 15:4 is particularly desirable.

The cyan pigment contained in the cyan ink preferably represents 0.1 to 10% by mass, more preferably 1 to 10% by mass, and even more preferably 2 to 10% by mass, of the total mass of the ink.

C.I. Pigment Blue 15:3 and/or 15:4 preferably accounts for at least 80% by mass, more preferably at least 90% by mass, and even more preferably 99% by mass or more, of all of the pigments in the cyan ink.

In addition to the cyan pigments described above, yellow pigments and/or green pigments may also be added to the cyan ink to adjust the hue of the ink.

Examples of yellow pigments or green pigments that may be included in the cyan ink include C.I. Pigment Yellow 1, 2, 3, 12, 14, 16, 17, 73, 74, 75, 83, 93, 95, 97, 98, 109, 110, 114, 128, 129, 138, 139, 147, 150, 151, 154, 155, 180 and 185, and C.I. Pigment Green 7, 36 and 58, and either one, or two or more, of these pigments may be used. Among these, C.I. Pigment Yellow 150, 180 and 185, and C.I. Pigment Green 7 are preferred.

The amount of yellow pigment and/or green pigment included in the cyan ink is preferably within a range from 0.01 to 10% by mass, and more preferably from 0.01 to 1% by mass, of all of the pigments contained within the cyan ink. In those cases where both a yellow pigment and green pigment are included, the total amount of these pigments preferably satisfies the above range. By including a yellow pigment and/or green pigment in the cyan ink, the color reproducibility in the green region can be enhanced.

<Yellow Ink Pigment>

The yellow pigment included in the yellow ink is preferably an azo pigment, azomethine pigment or isoindoline pigment. Specific examples include C.I. Pigment Yellow 1, 2, 3, 12, 14, 16, 17, 73, 74, 75, 83, 93, 95, 97, 98, 109, 110, 114, 128, 129, 138, 139, 147, 150, 151, 154, 155, 180 and 185, and either one, or two or more, of these pigments may be used.

Examples of the azo pigments include monoazo pigments such as C.I. Pigment Yellow 1, 2, 3, 73, 74, 97 and 98, disazo pigments such as C.I. Pigment Yellow 12, 13, 14, 15, 16, 17, 55, 83, 87 and 114, polyazo (condensed azo) pigments such as C.I. Pigment Yellow 93, 95 and 128, nickel azo yellow pigments such as C.I. Pigment Yellow 150 and 153, and azo pigments having a benzimidazolone skeleton (hereafter also referred to as "benzimidazolone pigments") such as C.I. Pigment Yellow 151, 154 and 180;

examples of the azomethine pigments include C.I. Pigment Yellow 129, and isoindolinone pigments such as C.I. Pigment 109 and 110; and examples of isoindoline pigments include C.I. Pigment Yellow 139 and 185, but this is not an exhaustive list.

A nickel azo yellow pigment, benzimidazolone pigment or isoindoline pigment is particularly preferred in terms of color development and light resistance. C.I. Pigment 150 is preferred as the nickel azo yellow pigment, C.I. Pigment 151 or 180 is preferred as the benzimidazolone pigment, and C.I. Pigment 185 is preferred as the isoindoline pigment.

In particular, yellow inks containing at least one pigment selected from among C.I. Pigment Yellow 150, 151, 180 and 185 are particularly preferred, as they exhibit excellent color reproducibility in the red region when combined with the magenta ink of the present embodiment.

The particle size of the C.I. Pigment Yellow 150, 151, 180 and 185, reported as a D50 value measured by the laser diffraction method, is preferably within a range from 50 to 500 nm, and more preferably from 150 to 450 nm, wherein the D50 value represents the particle size that means the number of particles having a particle size equal to or smaller than this value represents 50% of all of the particles. A particle size distribution that satisfies this range is superior in terms of color development, ink storage stability and ink discharge characteristics.

The yellow pigment contained in the yellow ink preferably represents 0.1 to 10% by mass, more preferably 1 to 10% by mass, and even more preferably 2 to 10% by mass, of the total mass of the ink.

Besides yellow inks having the amount of pigment described above, the present invention does not necessarily exclude yellow inks having smaller amounts of the pigment as light yellow inks.

Of the pigments included in the yellow ink, one or more pigments selected from among C.I. Pigment Yellow 150, 151, 180 and 185 preferably account for at least 50% by mass, more preferably at least 70% by mass, and even more preferably 90% by mass or more (including 100% by mass), of all of the yellow pigments.

In particular, C.I. Pigment Yellow 180 and/or 185 preferably accounts for at least 50% by mass, more preferably at least 70% by mass, and even more preferably 90% by mass or more (including 100% by mass), of all of the yellow pigments.

In those cases where the ink contains two or more of the above pigments, the total amount of the pigments preferably satisfies the above range.

Typically used yellow pigments may also be mixed with the above pigments depending on the weather resistance and coloration desired.

<Orange Ink Pigment>

Examples of pigments that can be used favorably in orange inks include either one, or two or more, pigments selected from the group consisting of C.I. Pigment Orange 5, 13, 43, 62 and 64, as well as C.I. Pigment Red 17, 49:2, 112, 149, 177, 178, 188, 255 and 264.

Among these, in terms of the ink storage stability and inkjet discharge stability, C.I. Pigment Orange 64 is preferably included. In this case, use of the ink in combination with the aforementioned cyan, yellow and magenta inks enables a broader range of color reproducibility to be achieved.

The amount of pigment contained in the orange ink preferably represents 0.1 to 10% by mass, more preferably 2 to 10% by mass, and even more preferably 3 to 7% by mass, of the total mass of the ink.

Of the pigments included in the orange ink, C.I. Pigment Orange 64 preferably accounts for at least 50% by mass, more preferably at least 60% by mass, and even more preferably 70% by mass or more (including 100% by mass), of all of the orange pigments.

In addition to the orange pigment described above, the orange ink preferably further contains a magenta pigment. The magenta pigment included in the orange ink is preferably a quinacridone pigment, and specific examples include C.I. Pigment Red 122, 202 and 209, and C.I. Pigment Violet 19, of which either one, or two or more, pigments may be used. Among these, C.I. Pigment 122 and C.I. Pigment Violet 19 are preferred. By including these pigments, the transmission efficiency of active energy rays improves, which enhances the curability compared with the case of an ink containing only an orange pigment.

When a quinacridone pigment is included in the orange ink, the amount of the magenta pigment is preferably within a range from 1 to 50% by mass, more preferably from 10 to 45% by mass, and even more preferably from 15 to 40% by mass, relative to 100% by mass of all of the pigments contained in the orange ink.

By including a magenta pigment in the orange ink, the resulting orange ink can be combined with the magenta ink of an embodiment of the present invention to enhance the color reproducibility in the red region.

<Violet Ink Pigment>

Examples of pigments that can be used favorably in violet inks include either one, or two or more, pigments selected from the group consisting of C.I. Pigment Violet 1, 3, 23, 27, 32 and 37.

Among these, in terms of the ink stability and inkjet discharge stability, C.I. Pigment Violet 23 is preferably included. In this case, use of the ink in combination with the aforementioned cyan, yellow and magenta inks enables a broader range of color reproducibility to be achieved.

The amount of pigment contained in the violet ink preferably represents 0.1 to 10% by mass, and more preferably 2 to 10% by mass, of the total mass of the ink.

Of the pigments included in the violet ink, C.I. Pigment Violet 1, 3, 23, 27, 32 and 37 preferably account for at least 50% by mass, more preferably at least 70% by mass, and even more preferably 90% by mass or more (including 100% by mass), of all of the violet pigments. In those cases where the ink contains two or more of the above pigments, the total amount of the pigments preferably satisfies the above range.

In particular, C.I. Pigment Violet 23 preferably accounts for at least 50% by mass, more preferably at least 70% by mass, and even more preferably 90% by mass or more (including 100% by mass), of all of the violet pigments.

The hue angle H° defined in the CIELAB color space for the magenta ink of the present embodiment on a recording medium is preferably within a range from 330 to 360° and from 0 to 80°, and is more preferably from 0 to 80°.

In the color ink set containing the magenta ink of the present embodiment, the hue angle H° of the cyan ink is preferably within a range from 200 to 260°, and more preferably from 220 to 260°. The hue angle H° of the yellow ink is preferably within a range from 80 to 110°, and more preferably from 90 to 110°.

By ensuring that the hue angles of the color inks each satisfy the respective range above, a favorable image with excellent color development and color reproducibility can be obtained.

The hue angle H° is calculated as:

$$H° = \tan^{-1}(b^*/a^*) + 180 \text{ (when } a^* < 0\text{), or}$$

$$H° = \tan^{-1}(b^*/a^*) + 360 \text{ (when } a^* > 0 \text{ and } b^* < 0\text{), or}$$

$$H° = \tan^{-1}(b^*/a^*) \text{ (when } a^* > 0 \text{ and } b^* \geq 0\text{).}$$

In the above formulas, a* and b* represent sensible chromaticity indices defined in the CIELAB color space.

The color development of the magenta ink on a recording medium can be evaluated using the chroma defined in the CIELAB color space. The magenta ink of the present embodiment has a chroma that is preferably at least 75, and more preferably 80 or greater. By ensuring the chroma is at least 75, favorable color reproducibility can be obtained in a set with other color inks.

The chroma is calculated as shown below.

$$C^*=[(a^*)^2+(b^*)^2]^{1/2}$$

In the formula, a* and b* represent sensible chromaticity indices defined in the CIELAB color space.

<Ink Set>

The magenta ink according to an embodiment can be used to prepare an ink set having superior color reproducibility and excellent light resistance by forming a color set with a yellow ink and a cyan ink.

Moreover, by forming an ink set that also includes a violet ink and/or an orange ink, a color ink set with even better color reproducibility can be prepared. In particular, a color set containing the magenta ink of an embodiment of the present invention together with a yellow ink, a cyan ink and a violet ink exhibits superior color reproducibility.

The hue angle H° defined in the CIELAB color space for the orange ink on a recording medium is preferably within a range from 0 to 80°. The hue angle of the violet ink is preferably from 260 to 330°.

A color ink set according to an embodiment of the present invention relates to an inkjet ink set which, in addition to the magenta ink of the embodiment described above, contains a phthalocyanine pigment for a cyan ink, and an azo pigment, azomethine pigment or isoindoline pigment for a yellow ink.

In terms of color reproducibility, the color ink set preferably uses a magenta ink containing Pigment Red 266 as a pigment, and a yellow ink containing one or more of Pigment Yellow 150, 151, 180 and 185 as a pigment.

The color ink set according to this embodiment may also include a black ink. By also including a black ink, superior text representation and contrast can be achieved, and images of higher precision can be obtained.

Examples of the pigment contained in the black ink include inorganic pigments, including carbon blacks (C.I. Pigment Black 7) such as furnace black, lamp black, acetylene black, channel black and thermal black, and other inorganic pigments such as iron oxide pigments, and organic pigments such as aniline black (C.I. Pigment Black 1). The use of a carbon black is particularly preferred.

The amount of pigment contained in the black ink preferably represents 0.1 to 10% by mass, and more preferably 2 to 10% by mass, of the total mass of the ink.

Besides black inks having the amount of pigment described above, the present invention does not necessarily exclude black inks having smaller amounts of the pigment as light black inks or grey inks.

Of the pigments included in the black ink, a carbon black preferably accounts for at least 60% by mass, more preferably at least 70% by mass, and even more preferably 90% by mass or more (including 100% by mass), of all of the pigments.

The ink set of the present embodiment may also include a white ink. By also including a white ink, good visibility can be achieved on transparent recording media or recording media having low lightness, and by including the white ink together with a color ink set, high-precision full color images can be achieved with a similar level of clarity to that obtained when recording on a white medium.

Inorganic or organic white pigments can be used as the pigment contained in the white ink. Examples of inorganic white pigments include sulfates of alkaline earth metals such as barium sulfate, carbonates of alkaline earth metals such as calcium carbonate, silica materials such as finely powdered silica and synthetic silicates, as well as calcium silicate, alumina, alumina hydrate, titanium oxide, zinc oxide, talc and clay. In terms of hiding power and tinting strength, titanium oxide is preferred.

The average particle size of the white pigment, reported as a D50 value measured by the laser diffraction method, is preferably within a range from 50 to 500 nm, with a value of at least 50 nm being preferred from the viewpoint of hiding power, and a value of not more than 500 nm being preferred from the viewpoints of the ink storage properties and preventing any deterioration in the discharge characteristics. An average particle size of 100 to 300 nm is more preferred.

The D50 value refers to the value obtained when the ink is diluted 200 to 1,000 fold with ethyl acetate, and the particle size is then measured using a dynamic light-scattering particle size distribution analyzer (MICROTRAC UPA150 manufactured by Nikkiso Co., Ltd.).

The pigment contained in the white ink preferably represents 3 to 50% by mass, more preferably 5 to 30% by mass, and even more preferably 10 to 25% by mass, of the total mass of the white ink.

The ink set of the present embodiment containing cyan, yellow and magenta inks can be printed with superior color reproducibility not only to paper substrates, but also to various other substrates including plastic substrates such as PET substrates, PE substrates, PP substrates and PVC substrates.

Further, if a violet ink is also included as a special color ink, then superior color reproducibility cab be obtained.

Further, depending on the application and the image quality required, light-colored inks such as light yellow, light magenta and light cyan inks, containing lower concentrations of pigment within the ink, may also be used in combination with the above inks.

<Polymerizable Monomer>

When the inkjet ink according to an embodiment of the present invention is used as an active energy ray-curable ink, the ink also includes a polymerizable monomer (hereafter also referred to as simply a "monomer"). There are no particular limitations on the polymerizable monomer, provided it is a compound that undergoes a polymerization reaction and cures when imparted with some form of energy, and any type of a monomer, oligomer or polymer may be used. Particularly preferred monomers include any of the various polymerizable monomers known within the technical field as radical-polymerizable monomers, which undergo a polymerization reaction in the presence of an initiating species generated from a polymerization initiator which can be added as appropriate.

In those cases where an inkjet ink according to an embodiment of the present invention is used as an active energy ray-curable ink, the amount of the polymerizable monomer is preferably within a range from 30 to 99% by mass, more preferably from 50 to 95% by mass, and even more preferably from 60 to 90% by mass, relative to the total mass of the ink.

Either a single polymerizable monomer or a mixture of a plurality of polymerizable monomers may be used to alter properties such as the reaction rate and the physical properties of the cured film and the ink. Further, the polymerizable monomer may be either a monofunctional monomer or a difunctional or higher polyfunctional monomer. If the proportion of monofunctional monomers is high, then the cured film tends to be more flexible, whereas a higher proportion of polyfunctional monomers tends to yield superior curability.

Accordingly, the relative proportions of monofunctional monomers and polyfunctional monomers may be determined as appropriate in accordance with the intended application.

In terms of the curability and the physical properties of the cured film, the ink of an embodiment preferably includes a monofunctional monomer and/or a difunctional monomer. The monofunctional monomer and/or difunctional monomer preferably represents 30 to 99% by mass, more preferably 50 to 95% by mass, and even more preferably 60 to 90% by mass, of the total mass of the ink. When the ink includes both a monofunctional monomer and a difunctional monomer, the total amount of the two monomers preferably satisfies the above range.

Examples of radical-polymerizable monomers include (meth)acrylate compounds, vinyl ether compounds, compounds having a (meth)acrylate group and a vinyl ether group, allyl compounds, N-vinyl compounds and unsaturated carboxylic acids, but this is not an exhaustive list.

Among these, one or more compounds selected from among (meth)acrylate compounds, compounds having a (meth)acrylate group and a vinyl ether group, and N-vinyl compounds are preferably included.

In the present description, unless specifically stated otherwise, the terms "(meth)acryloyl" and "(meth)acrylate)" mean "acryloyl and/or methacryloyl" and "acrylate and/or methacrylate" respectively.

Examples of monofunctional (meth)acrylate compounds include benzyl (meth)acrylate, 2-phenoxyethyl (meth)acrylate, (ethoxylated or propoxylated) 2-phenoxyethyl (meth)acrylate, dicyclopentenyl (oxyethyl) (meth)acrylate, phenoxy diethylene glycol (meth)acrylate, 2-methoxethyl (meth)acrylate, methoxy triethylene glycol (meth)acrylate, 2-ethoxyethyl (meth)acrylate, 2-(2-ethoxyethoxy)ethyl (meth)acrylate, methoxy dipropylene glycol (meth)acrylate, dipropylene glycol (meth)acrylate, nonylphenol EO-modified acrylate, nonylphenol PO-modified acrylate, o-phenylphenol EO-modified acrylate, 2-ethylhexyl EO-modified acrylate, β-carboxyethyl (meth)acrylate, trimethylolpropane formal (meth)acrylate, isoamyl (meth)acrylate, cyclohexyl (meth)acrylate, tetrahydrofurfuryl (meth)acrylate, isobornyl (meth)acrylate, norbornyl (meth)acrylate, dicyclopentanyl (meth)acrylate, isononyl (meth)acrylate, stearyl (meth)acrylate, n-octyl acrylate, isooctyl (meth)acrylate, lauryl (meth)acrylate, isodecyl (meth)acrylate, tridecyl (meth)acrylate, caprolactone (meth)acrylate, 2-hydroxy-3-phenoxypropyl (meth)acrylate, 1,4-cyclohexanedimethanol (meth)acrylate, 2-hydroxyethyl (meth)acrylate, 2-hydroxypropyl (meth)acrylate, 4-hydroxybutyl (meth)acrylate, acryloylmorpholine and N-acryloyloxyethyl hexahydrophthalimide, but this is not an exhaustive list.

Examples of monofunctional N-vinyl compounds include N-vinylcaprolactam, N-vinylpyrrolidone and N-vinylformamide, but this is not an exhaustive list.

When the ink of an embodiment of the present invention includes a monofunctional monomer, the amount of the monofunctional monomer preferably represents 1 to 90% by mass, more preferably 3 to 50% by mass, even more preferably 5 to 40% by mass, even more preferably 5 to 30% by mass, and particularly preferably 5 to 20% by mass, of the total mass of polymerizable monomers within the ink. Provided the amount satisfies this range, curing wrinkles can be better suppressed, and superior color development can be obtained.

On the other hand, if the amount of the monofunctional monomer is 20% by mass or less of the total mass of all the polymerizable monomers, then the curability improves, and the adhesion to substrates also improves.

When a monofunctional monomer is included, the monomer preferably includes an aliphatic ethylenic polymerizable compound that does not have a cyclic structure. The amount of this monofunctional aliphatic ethylenic polymerizable compound that does not have a cyclic structure preferably represents 1 to 50% by mass, more preferably 5 to 40% by mass, even more preferably 5 to 30% by mass, and particularly preferably 5 to 20% by mass, of the total mass of all the monomers.

Examples of preferred monofunctional aliphatic ethylenic polymerizable compounds that do not have a cyclic structure include acrylate compounds having a linear or branched alkyl group with a carbon number of 8 to 18, such as 2-(2-ethoxyethoxy)ethyl acrylate, isononyl acrylate, stearyl acrylate, n-octyl acrylate, isooctyl acrylate, lauryl acrylate, isodecyl acrylate and tridecyl acrylate, and caprolactone acrylate. Of these, lauryl acrylate is more preferably included.

Examples of difunctional (meth)acrylates include 1,6-hexanediol di(meth)acrylate, ethoxylated (or propoxylated) 1,6-hexanediol di(meth)acrylate, 1,10-decanediol di(meth)acrylate, neopentyl glycol di(meth)acrylate, 2,4-dimethyl-1,5-pentanediol di(meth)acrylate, 3-methyl-1,5-pentanediol di(meth)acrylate, butylethylpropanediol di(meth)acrylate, ethoxylated cyclohexanemethanol di(meth)acrylate, polyethylene glycol di(meth)acrylate, oligoethylene glycol di(meth)acrylate, ethylene glycol di(meth)acrylate, 2-ethyl-2-butylbutanediol di(meth)acrylate, hydroxypivalic acid neopentyl glycol di(meth)acrylate, EO-modified bisphenol A di(meth)acrylate, bisphenol F polyethoxy di(meth)acrylate, polypropylene glycol di(meth)acrylate, oligopropylene glycol di(meth)acrylate, 1,4-butanediol di(meth)acrylate, 2-ethyl-2-butylpropanediol di(meth)acrylate, 1,9-nonanediol di(meth)acrylate, propoxylated ethoxylated bisphenol A di(meth)acrylate, propoxylated bisphenol A di(meth)acrylate, ethoxylated bisphenol A di(meth)acrylate, ethoxylated bisphenol F di(meth)acrylate, isocyanuric acid EO-modified diacrylate, tricyclodecane di(meth)acrylate, dipropylene glycol di(meth)acrylate, tripropylene glycol di(meth)acrylate, PO-modified neopentyl glycol di(meth)acrylate, EO-modified neopentyl glycol di(meth)acrylate, dimethyloltricyclodecane di(meth)acrylate, cyclohexanedimethanol di(meth)acrylate, trimethylolpropane di(meth)acrylate, neopentyl glycol-modified trimethylolpropane di(meth)acrylate and dicyclopentanyl di(meth)acrylate, but this is not an exhaustive list.

Examples of trifunctional (meth)acrylates include trimethylolpropane tri(meth)acrylate, trim ethylolethane tri(meth)acryl ate, alkylene oxide-modified tri(meth)acrylates of trimethylolpropane (such as trimethylolpropane EO-modified triacrylate and trimethylolpropane PO-modified triacrylate), tetramethylolmethane tri(meth)acrylate, pentaerythritol tri(meth)acrylate, dipentaerythritol tri(meth)acrylate, trimethylolpropane tri((meth)acryloyloxypropyl) ether, isocyanuric acid alkylene oxide-modified tri(meth)acrylates, propionic acid dipentaerythritol tri(meth)acrylate, tri((meth)acryloyloxyethyl) isocyanurate, hydroxypivalaldehyde-modified dimethylolpropane tri(meth)acrylate, sorbitol tri(meth)acrylate, propoxylated trimethylolpropane tri(meth)acrylate, ethoxylated glycerol triacrylate and propoxylated glycerol triacrylate, but this is not an exhaustive list.

Examples of tetrafunctional (meth)acrylates include pentaerythritol tetra(meth)acrylate, sorbitol tetra(meth)acrylate, ditrimethylolpropane tetra(meth)acrylate, propionic acid dipentaerythritol tetra(meth)acrylate, ethoxylated pentaerythritol tetra(meth)acrylate and tetramethylolmethane tetra(meth)acrylate, but this is not an exhaustive list.

Examples of pentafunctional (meth)acrylates include sorbitol penta(meth)acrylate and dipentaerythritol penta(meth)acrylate, but this is not an exhaustive list.

Examples of hexafunctional (meth)acrylates include dipentaerythritol hexa(meth)acrylate, sorbitol hexa(meth)acrylate, alkylene oxide-modified hexa(meth)acrylates of phosphazene and ε-caprolactone-modified dipentaerythritol hexa(meth)acrylate, but this is not an exhaustive list.

Examples of compounds (difunctional or higher polymerizable monomers) having a (meth)acryloyl group and a vinyl ether group include 2-(2-vinyloxyethoxy)ethyl acrylate and 2-(2-vinyloxyethoxy)ethyl methacrylate, but this is not an exhaustive list.

When a difunctional or higher polyfunctional monomer is included, the amount of the monomer is preferably within a range from 10 to 100% by mass, more preferably 50 to 95% by mass, and even more preferably 60 to 95% by mass, relative to the total mass of all the monomers.

These polymerizable monomers may be used individually, or two or more monomers may be combined.

Among the polymerizable monomers mentioned above, including 2-phenoxyethyl acrylate, N-vinylcaprolactam, nonylphenol EO-modified acrylate or lauryl acrylate as the monofunctional monomer is preferred in terms of achieving low viscosity and high reactivity.

Further, 1,9-nonanediol diacrylate, 1,10-decanediol diacrylate, 3-methyl-1,5-pentanediol di(meth)acrylate, dipropylene glycol diacrylate, tripropylene glycol diacrylate or neopentyl glycol-modified trimethylolpropane di(meth)acrylate is preferred as the difunctional polyfunctional (meth)acrylate in terms of achieving low viscosity and high reactivity, and of these, 1,9-nonanediol diacrylate, 1,10-decanediol diacrylate or dipropylene glycol diacrylate is preferred in terms of achieving low odor.

Moreover, trimethylolpropane triacrylate, trimethylolpropane EO-modified triacrylate, pentaerythritol tetraacrylate or dipentaerythritol hexaacrylate is preferred as the trifunctional or higher polyfunctional (meth)acrylate in terms of curability.

Furthermore, 2-(2-vinyloxyethoxy)ethyl acrylate is preferred as the compound having a (meth)acryloyl group and a vinyl ether group in terms of achieving low viscosity and good curability.

The ink of an embodiment preferably contains a polymerizable monomer having an EO/PO skeleton, namely a polymerizable monomer having at least one of an ethylene oxide unit (EO) or a propylene oxide unit (PO) within the molecular structure.

The EO/PO skeleton can be represented by the following formula.

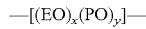

In the formula, EO represents an ethylene oxide unit (—CH$_2$—CH$_2$—O—), PO represents a propylene oxide unit (—CH$_2$—CH$_2$—CH$_2$—O—, —CH(CH$_3$)—CH$_2$—O— or —CH$_2$—CH(CH$_3$)—O—), x represents an integer of 0 to 8, and y represents an integer of 0 to 8, provided that x+y≥1. It is preferable that x is an integer of 0 to 4, y is an integer of 0 to 4, and x+y is a value within a range from 1 to 4. Examples of the configuration of the EO and PO addition include random copolymerization, block copolymerization and combinations thereof.

Specifically, the polymerizable monomer having an EO/PO skeleton is preferably one or more monomers selected from the group consisting of 2-phenoxyethyl acrylate, dipropylene glycol di(meth)acrylate, (neopentyl glycol-modified) trimethylolpropane di(meth)acrylate, tripropylene glycol di(meth)acrylate, trimethylolpropane EO-modified triacrylate, and 2-(2-vinyloxyethoxy)ethyl acrylate. In terms of curability and discharge stability, at least one monomer selected from the group consisting of 2-phenoxyethyl acrylate, dipropylene glycol diacrylate and 2-(2-vinyloxyethoxy)ethyl acrylate is preferred.

Including the polymerizable monomer having an EO/PO skeleton in an amount of 60 to 100% by mass relative to the total mass of polymerizable monomers is preferred in terms of increasing the printing speed by achieving higher reactivity. An amount of 70 to 100% by mass is more preferred, and an amount of 80 to 98% by mass is even more preferred. When the amount added satisfies this range, the reactivity improves, and the curability of the coating film becomes more uniform through the film from top to bottom. This is desirable, as it suppresses the occurrence of curing wrinkles on the coating film surface, which occur as a result of only the coating film surface undergoing curing. Particularly in the case of inkjet ink coating films having a thickness of 5 μm or greater, including the polymerizable monomer having an EO/PO skeleton in an amount of 70 to 100% by mass relative to the total mass of polymerizable monomers better suppresses wrinkles, and enables superior color development to be achieved.

The molecular weight of the polymerizable monomer having an EO/PO skeleton is preferably within a range from 160 to 450, and more preferably from 180 to 290. Polymerizable monomers having an EO/PO skeleton that have a molecular weight of 180 to 290 preferably represent at least 60% by mass, more preferably 70 to 100% by mass, and even more preferably 80 to 98% by mass, of the total mass of all the polymerizable monomers.

The polymerizable monomer having an EO/PO skeleton preferably includes a difunctional monomer. The difunctional monomer having an EO/PO skeleton preferably represents 60 to 100% by mass, more preferably 70 to 100% by mass, and even more preferably 80 to 100% by mass, of all the polymerizable monomers.

Among the various possibilities, the ink preferably contains 2-(2-vinyloxyethoxy)ethyl acrylate. The polymerizable monomer 2-(2-vinyloxyethoxy)ethyl acrylate exhibits low viscosity and high reactivity. As a result, a magenta ink can be provided that exhibits good discharge stability and excellent curability. The amount added of the 2-(2-vinyloxyethoxy)ethyl acrylate is preferably within a range from 5 to 70% by mass, more preferably from 10 to 50% by mass, and even more preferably from 10 to 40% by mass, relative to the total mass of the ink. Provided the amount satisfies the above range, the viscosity of the ink composition falls within a favorable range. Further, the polymerization reactivity with the polymerizable monomers besides the 2-(2-vinyloxyethoxy)ethyl acrylate also improves, meaning stable discharge and satisfactory curability can be achieved even when the printing speed is high.

Those cases where 2-(2-vinyloxyethoxy)ethyl acrylate and dipropylene glycol di(meth)acrylate are included are preferred in terms of achieving low viscosity, low odor and high reactivity, and enable printed items having a reduced level of curing wrinkles and good color development to be obtained.

The total amount of the 2-(2-vinyloxyethoxy)ethyl acrylate and dipropylene glycol di(meth)acrylate is preferably within a range from 30 to 99% by mass, more preferably from 40 to 95% by mass, even more preferably from 40 to 85% by mass, and in some cases, particularly preferably from 50 to 80% by mass, relative to the total mass of the ink.

The monomer compositions of the various color inks that constitute the ink set may be the same or different. In one embodiment, in terms of suppressing curing wrinkles during color printing, the monomer compositions are preferably similar across the color inks, and for example, in some cases, each of the color inks preferably contain about the same amount of monofunctional monomers. For example, the difference in the monofunctional monomer content relative to the total mass of the ink across all of the color inks is preferably not more than 10% by mass, and even more preferably 5% by mass or less.

In the ink set of an embodiment, it is preferable that each of the color inks contains about the same amount, or more preferably exactly the same amount, of monofunctional monomers, or that all of the inks contain no monofunctional monomers.

<Photopolymerization Initiator>

In those cases where the inkjet ink of an embodiment of the present invention is used as an active energy ray-curable ink, the ink preferably also includes a photopolymerization initiator. Any of the various photopolymerization initiators known in the technical field may be used as the photopolymerization initiator in this embodiment. For example, the use of photopolymerization initiators that generate radicals by molecular cleavage or hydrogen abstraction is preferred. In this embodiment, a single photopolymerization initiator may be used alone, or a combination of two or more photopolymerization initiators may be used. Further, a combination of a photopolymerization initiator that generates radicals and a photopolymerization initiator that generates cations may also be used.

Specific examples of the photopolymerization initiator include:

alkylphenone-based photopolymerization initiators such as 2,2-dimethoxy-1,2-diphenylethan-1-one (IRGACURE 651 manufactured by BASF Corporation), 1-hydroxycyclohexyl phenyl ketone (IRGACURE 184 manufactured by BASF Corporation), 2-hydroxy-2-methyl-1-phenylpropan-1-one (DAROCUR 1173 manufactured by BASF Corporation), 1-[4-(2-hydroxyethoxy)-phenyl]-2-hydroxy-2-methyl-1-propan-1-one (IRGACURE 2959 manufactured by BASF Corporation), 2-hydroxy-1-{4-[4-(2-hydroxy-2-methylpropionyl)-benzyl]-phenyl}-2-methylpropan-1-one (IRGACURE 127 manufactured by BASF Corporation), phenylglyoxylic acid methyl ester (DAROCUR MBF manufactured by BASF Corporation), 2-methyl-1-[4-(methylthio)phenyl]-2-morpholinopropan-1-one (IRGACURE 907 manufactured by BASF Corporation), 2-benzyl-2-dimethylamino-1-(4-morpholinophenyl)-butanone-1 (IRGACURE 369 manufactured by BASF Corporation), 2-dimethylamino-2-(4-methylbenzyl)-1-(4-morpholin-4-yl-phenyl)-butan-1-one (IRGACURE 379 manufactured by BASF Corporation), and oligo(2-hydroxy-2-methyl-1-(4-(1-methylvinyl)phenyl)propanone) (ESACURE ONE and ESACURE KIP150 manufactured by Lamberti S.p.A.);

acylphosphine oxide-based photopolymerization initiators such as bis(2,4,6-trimethylbenzoyl)-phenylphosphine oxide (IRGACURE 819 manufactured by BASF Corporation) and 2,4,6-trimethylbenzoyl-diphenylphosohine oxide (IRGACURE TPO manufactured by BASF Corporation);

oxime ester-based photopolymerization initiators such as 1,2-octanedione-1-[4-(phenylthio)-2-(O-benzoyloxime)] (IRGACURE OXE 01 manufactured by BASF Corporation) and ethanone-1-[9-ethyl-6-(2-methylbenzoyl)-9H-carbazol-3-yl]-1-(0-acetyloxime) (IRGACURE OXE 02 manufactured by BASF Corporation); and benzophenone-based photopolymerization initiators such as benzophenone, 4-phenylbenzophenone, isophthalphenone, 4-benzoyl-4'-methyl-diphenyl sulfide (KAYACURE BMS, manufactured by Nippon Kayaku Co., Ltd.) and 1-[4-(4-benzoylphenylsulfanyl)phenyl]-2-methyl-2-(4-methylphenylsulfonyl)propan-1-one (ESACURE 1001M manufactured by Lamberti S.p.A.), but this is not an exhaustive list.

Among the above, in terms of curability and storage stability, the use of at least one photopolymerization initiator selected from the group consisting of bis(2,4,6-trimethylbenzoyl)-phenylphosphine oxide, 2,4,6-trimethylbenzoyl-diphenylphosohine oxide, 4-phenylbenzophenone, 4-benzoyl-4'-methyl-diphenyl sulfide, 2-benzyl-2-dimethylamino-1-(4-morpholinophenyl)-butanone-1 and 2-hydroxy-1-{4-[4-(2-hydroxy-2-methylpropionyl)-benzyl]-phenyl}-2-methylpropan-1-one is preferred.

In terms of curability, an acylphosphine oxide-based photopolymerization initiator and a benzophenone-based photopolymerization initiator are preferably included, and including an acylphosphine oxide-based photopolymerization initiator, a benzophenone-based photopolymerization initiator and an alkylphenone-based photopolymerization initiator is even more preferred.

Further, a sensitizer for the photopolymerization initiator may also be used. Examples of the sensitizer include amines and thioxanthones that do not undergo an addition reaction with the polymerizable monomers.

Specific examples of the amines include trimethylamine, methyldimethanolamine, triethanolamine, p-diethylaminoacetophenone, ethyl p-dimethylaminobenzoate, isoamyl p-dimethylaminobenzoate, N,N-dimethylbenzylamine, ethyl 4-(dimethylamino)benzoate and 4,4'-bis(diethylamino)benzophenone.

Examples of the thioxanthones include thioxanthone, 2,4-diethylthioxanthanone and 2-isopropylthioxanthone.

In terms of curability and wrinkle suppression, an amine is preferably included in addition to the photopolymerization initiator described above. Among the various amines, ethyl-4-(dimethylamino)benzoate and 4,4'-bis(diethylamino)benzophenone are preferred, and ethyl-4-(dimethylamino)benzoate is particularly desirable.

It is preferable that ethyl-4-(dimethylamino)benzoate or 4,4'-bis(diethylamino)benzophenone is used as the amine and 2-isopropylthioxanthone is used as the thioxanthone, and the use of ethyl-4-(dimethylamino)benzoate and 2-isopropylthioxanthone is even more preferred. For the photopolymerization initiator and the sensitizer, it is preferable that compounds which exhibit excellent solubility in the ink composition and do not impair ultraviolet ray transmittance are selected.

Moreover, by using a combination of at least one photopolymerization initiator selected from the group consisting of bis(2,4,6-trimethylbenzoyl)-phenylphosphine oxide, 2,4,6-trimethylbenzoyl-diphenylphosohine oxide, 4-phenylbenzophenone, 4-benzoyl-4'-methyl-diphenyl sulfide and 2-benzyl-2-dimethylamino-1-(4-morpholinophenyl)-butanone-1, and at least one sensitizer selected from the group consisting of ethyl-4-dimethylaminobenzoate and 4,4'-bis(diethylamino)benzophenone, ultraviolet rays can be absorbed efficiently, enabling radicals to be generated at a high reaction rate, and therefore uniform curing can be achieved right through to the interior of the coating film. As a result, any deterioration in color development due to the occurrence of wrinkles on the coating film surface caused by curing irregularities can be suppressed. Particularly in the case of inkjet ink coating films having a film thickness of 5 µm or greater, excellent color development can be achieved.

The amounts used of the aforementioned photopolymerization initiator and sensitizer, reported as a total amount of both items, is preferably within a range from 2 to 30% by mass, more preferably from 5 to 20% by mass, and even more preferably from 10 to 20% by mass, relative to the total mass of the polymerizable monomers. Provided the amount of the photopolymerization initiator is at least 2% by mass, good curability can be achieved more easily. On the other hand, provided the above amount is not more than 20% by mass, the curing rate can be increased efficiently, insoluble components from the photopolymerization initiator are less likely to occur even at low temperatures, and favorable inkjet discharge characteristics can be obtained more easily.

<Inhibitor>

In those cases where the inkjet ink of an embodiment of the present invention is used as an active energy ray-curable ink, a polymerization inhibitor may be used to enhance various ink properties such as the viscosity stability over time, the discharge stability over time, and the viscosity stability upon storage inside an inkjet recording apparatus. Hindered phenol-based compounds, phenothiazine-based compounds, hindered amine-based compounds and phosphorus-based compounds can be used particularly favorably as the polymerization inhibitor. Specific examples include 4-methoxyphenol, hydroquinone, methylhydroquinone, t-butylhydroquinone, 2,6-di-t-butyl-4-methylphenol, phenothiazine and aluminum N-nitrosophenylhydroxylamine. In terms of maintaining good curability while enhancing the stability over time, the polymerization inhibitor is preferably added to the ink in an amount of 0.01 to 2% by mass relative to the total mass of the ink composition.

<Solvent>

When the inkjet ink of the present embodiment is used as an active energy ray-curable ink, an organic solvent may be included to reduce the ink viscosity and improve the wet spreadability on the substrate.

In such cases, the amount of the organic solvent is preferably within a range from 0.01 to 30% by mass, more preferably from 0.1 to 20% by mass, and even more preferably from 0.2 to 10% by mass, relative to the total mass of the ink.

In those cases where the inkjet ink of the present embodiment is used as a solvent-based inkjet ink that does not undergo a curing step using active energy rays, the amount of the organic solvent is preferably within a range from 60 to 99.5% by mass, more preferably from 75 to 99% by mass, and even more preferably from 85 to 95% by mass, relative to the total mass of the ink.

Examples of the organic solvent include:

alkylene glycol monoalkyl ether monoacetate organic solvents such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, ethylene glycol monomethyl ether propionate, ethylene glycol monoethyl ether propionate, ethylene glycol monobutyl ether propionate, diethylene glycol monomethyl ether propionate, diethylene glycol monoethyl ether propionate, diethylene glycol monobutyl ether propionate, propylene glycol monomethyl ether propionate, dipropylene glycol monomethyl ether propionate, ethylene glycol monomethyl ether butyrate, ethylene glycol monoethyl ether butyrate, ethylene glycol monobutyl ether butyrate, diethylene glycol monomethyl ether butyrate, diethylene glycol monoethyl ether butyrate, diethylene glycol monobutyl ether butyrate, propylene glycol monomethyl ether butyrate and dipropylene glycol monomethyl ether butyrate, alkylene glycol diacetate organic solvents such as ethylene glycol diacetate, diethylene glycol diacetate, propylene glycol diacetate, dipropylene glycol diacetate, ethylene glycol acetate propionate, ethylene glycol acetate butyrate, ethylene glycol propionate butyrate, ethylene glycol dipropionate, ethylene glycol acetate dibutyrate, diethylene glycol acetate propionate, diethylene glycol acetate butyrate, diethylene glycol propionate butyrate, diethylene glycol dipropionate, diethylene glycol acetate dibutyrate, propylene glycol acetate propionate, propylene glycol acetate butyrate, propylene glycol propionate butyrate, propylene glycol dipropionate, propylene glycol acetate dibutyrate, dipropylene glycol acetate propionate, dipropylene glycol acetate butyrate, dipropylene glycol propionate butyrate, dipropylene glycol dipropionate and dipropylene glycol acetate dibutyrate, alkylene glycol monoalkyl ether organic solvents as ethylene glycol monobutyl ether, propylene glycol monomethyl ether, propylene glycol monobutyl ether, diethylene glycol monoethyl ether, diethylene glycol monobutyl ether, dipropylene glycol monomethyl ether, dipropylene glycol monoethyl ether, dipropylene glycol monobutyl ether, propylene glycol n-propyl ether, triethylene glycol monomethyl ether, triethylene glycol monoethyl ether, triethylene glycol monobutyl ether and tripropylene glycol monomethyl ether, alkanediol organic solvent such as ethylene glycol, diethylene glycol, triethylene glycol, propylene glycol (1,2-propanediol), 1,3-propanediol and dipropylene glycol, alkylene glycol dialkyl ether organic solvents such as diethylene glycol dimethyl ether, diethylene glycol diethyl ether, diethylene glycol di-n-propyl ether, diethylene glycol di-iso-propyl ether, diethylene glycol dibutyl ether, diethylene glycol methyl ethyl ether, triethylene glycol dimethyl ether, triethylene glycol diethyl ether, triethylene glycol ethyl methyl ether, tetraethylene glycol dimethyl ether, tetraethylene glycol diethyl ether and tetraethylene glycol ethyl methyl ether, organic solvents having an oxazolidinone structure such as 3-methyl-2-oxazolidinone and 3-ethyl-2-oxazolidinone, organic solvents having a lactam structure such as 2-pyrrolidone (γ-butyrolactam), 1-methyl-2-pyrrolidone, 1-ethyl-2-pyrrolidone, γ-valerolactam, γ-hexalactam, γ-heptalactam, γ-octalactam, γ-nonalactam, γ-decalactam, γ-undecalactam, δ-valerolactam, δ-hexalactam, δ-heptalactam, δ-octalactam, δ-nonalactam, δ-decalactam, δ-undecalactam and ε-caprolactam, organic solvents having a lactone structure such as γ-butyrolactone, γ-valerolactone, hexalactone, γ-heptalactone, γ-octalactone, γ-nonalactone, γ-decalactone, γ-undecalactone, δ-valerolactone, δ-hexalactone, δ-heptalactone, δ-octalactone, δ-nonalactone, δ-decalactone, δ-undecalactone and ε-caprolactone, oxygen-containing organic solvents such as ethylene carbonate, propylene carbonate and 1,2-butylene carbonate, lactate ester organic solvents such as methyl lactate, ethyl lactate, propyl lactate and butyl lactate, and organic solvents containing an alkoxyalkylainide, such as N,N-dimethyl-β-butoxypropionamide and N,N-dibutyl-β-butoxypropionamide, but this is not an exhaustive list.

Among the above solvents, at least one organic solvent selected from the group consisting of alkylene glycol monoalkyl ethers, alkylene glycol dialkyl ethers and alkylene glycol monoalkyl ether acetates is preferably included.

Moreover, among these, tetraethylene glycol dialkyl ethers, ethylene glycol monobutyl ether acetate and diethylene glycol diethyl ether are particularly desirable.

<Surface Modifier>

In the present description, a surface modifier means a substance which, upon addition, lowers the surface tension. In one embodiment of the present invention, the above surface modifier is a substance which, when added in an amount of 1.0% by mass, has the capability to lower the static surface tension of the ink by at least 3 mN/m compared with an ink that does not contain the surface modifier.

Examples of the surface modifier include silicone-based surface modifiers, fluorine-based surface modifiers, acrylic-based surface modifiers and acetylene glycol-based surface modifiers.

From the viewpoints of the surface tension-lowering capability and the compatibility with the polymerizable monomers, the use of a silicone-based surface modifier is preferred.

Examples of specific silicone-based surface modifiers include modified substances having a dimethylsiloxane skeleton, and among such substances, polyether-modified siloxane-based surface modifiers are preferred. Here, the term "polyether" refers, for example, to polyethylene oxide and polypropylene oxide. Examples of typical products that can be used favorably include polyether-modified silicone-based surfactants, including products from BYK-Chemie GmbH typified by polyether-modified siloxanes BYK (a registered trademark) 378, 348 and 349, and polyether-modified polydimethylsiloxanes such as BYK-UV 3500 and UV 3510, and products from Evonik Degussa GmbH including polyether-modified siloxane copolymers such as TEGO (a registered trademark) GLIDE 450, 440, 435, 432, 410, 406, 130, 110 and 100. Among these products, form the viewpoint of achieving favorable image formation, polyether-modified silicone-based surface modifiers such as BYK 378, 348 and UV 3510, and TEGO GLIDE 450, 440, 432 and 410 are preferred.

The amount of the silicone-based surface modifier is preferably within a range from at least 0.1% by mass to less than 5.0% by mass, and more preferably from at least 0.15% by mass to less than 3.0% by mass, relative to the total mass of the ink. Ensuring that the above amount is at least 0.1% by mass makes it easier to improve the wettability of the substrate by the ink. On the other hand, by ensuring the amount is less than 5.0% by mass, the ink storage stability can be more easily maintained.

<Pigment Dispersant>

When a color ink is produced as one embodiment of the present invention, a pigment dispersant (also called a pigment dispersing resin) is preferably included in the ink to improve the pigment dispersibility and the ink storage stability. Conventionally known materials can be used as the pigment dispersing resin. Among the various possibilities, basic dispersing resins having a basic functional group and resin-based dispersants having a urethane skeleton are preferred. Use of a resin-based dispersant having a urethane skeleton is preferred, as it enables a pigment dispersion having excellent high-frequency characteristics and favorable storage stability to be obtained relatively easily. Specific examples of this type of pigment dispersing resin include SOLSPERSE 32000, 76400, 76500, J100 and J180 manufactured by The Lubrizol Corporation, as well as Disperbyk 161, 162, 163, 164, 165, 166, 167 and 168.

In one embodiment, in terms of the long-term storage stability, the pigment dispersing resin is preferably an acrylic-based block copolymer. Moreover, a compound having a pyridine skeleton as a basic functional group is preferred. For example, copolymers prepared using 4-vinylpyridine, an alkyl (meth)acrylate and a (poly)oxyalkylene glycol (meth)acrylate or the like as monomer units are preferred.

One preferred example of a commercially available pigment dispersing resin of this type is the product EFKA 7701 (amine value: 40.0 mgKOH/g).

The weight-average molecular weight (hereafter Mw) of the pigment dispersant used in an embodiment is preferably within a range from 5,000 to 100,000, more preferably from 10,000 to 50,000, and even more preferably from 15,000 to 30,000. Provided the Mw falls within this range, the compatibility of the pigment dispersant in non-aqueous solvents is good, and therefore the pigment dispersion stability improves. Further, whitening of the ink coating film due to the pigment dispersing resin is also suppressed, thus improving the color development.

The Mw value can generally be determined as a polystyrene-equivalent molecular weight by gel permeation chromatography (hereafter GPC). For example, the Mw value can be represented as a polystyrene-equivalent molecular weight measured with a GPC (HLC-8320GPC, manufactured by Tosoh Corporation) fitted with an RI detector, using a TSKgel column (manufactured by Tosoh Corporation) and using DMF as the eluent. When a catalog value exists for the weight-average molecular weight of the polymer dispersant, the catalog value may be used.

The amine value of the pigment dispersant is preferably within a range from 5 to 50 mgKOH/g, more preferably from 10 to 50 mgKOH/g, and even more preferably from 20 to 45 mgKOH/g.

The acid value of the pigment dispersant is preferably within a range from 5 to 25 mgKOH/g, and more preferably from 5 to 20 mgKOH/g.

When the acid value and the amine value of the dispersant fall within the above respective ranges, the time taken in the pigment dispersion step for the viscosity of the dispersion to reach the type of low viscosity appropriate for an inkjet ink can be shortened.

Moreover, the ink storage stability improves, the clroma of the ink mixed color portions during printing is excellent, and the color reproducibility is also excellent.

The "amine value" represents the amine value per 1 g of the dispersant solid fraction, and indicates the value determined by performing potentiometric titration using a 0.1 N aqueous solution of hydrochloric acid, and then converting the result to an equivalent weight of potassium hydroxide.

The "acid value" represents the acid value per 1 g of the dispersant solid fraction, and indicates the value obtained by potentiometric titration in accordance with JIS K 0070.

In terms of the storage stability and inkjet discharge characteristics, the pigment dispersant used in an embodiment preferably has an Mw value of 10,000 to 50,000 and an amine value of 5 to 50 mgKOH/g.

The amount added of the pigment dispersing resin may be selected as appropriate in order to achieve the desired stability. In terms of achieving superior ink fluidity characteristics, the amount of the pigment dispersing resin may be set to 15 to 250 parts by mass per 100 parts by mass of the pigment. When the pigment dispersing resin is used in an amount within this range, the dispersion stability of the ink improves, and the quality of the ink after long-term storage tends to be very similar to the initial quality, which is very desirable. An amount of the pigment dispersing resin of 20 to 200 parts by mass per 100 parts by mass of the pigment is even more preferred. An amount within this range is preferred from the viewpoints of both the dispersibility and discharge characteristics of the ink.

In those cases where the pigment dispersant is a resin-based dispersant having a urethane skeleton, the amount of the pigment dispersing resin is preferably from 15 to 150 parts by mass, and even more preferably from 20 to 100 parts by mass, per 100 parts by mass of the pigment.

When the pigment dispersant is a basic dispersant composed of an acrylic-based block copolymer, the amount of the pigment dispersant is preferably from 50 to 250 parts by mass, and even more preferably from 60 to 200 parts by mass, per 100 parts by mass of the pigment.

<Ink Physical Properties>

The ink preferably has a viscosity at 25° C. of 5 to 25 mPa·s. When the viscosity is at least 5 mPa·s, the discharge is favorable. Provided the viscosity is not more than 25 mPa·s, there is little deterioration in the image quality, with little deterioration in the discharge precision. Moreover, in order to impart the ink with the high-frequency applicability required for high-speed printing, the viscosity is preferably from 8 to 14 mPa·s. Measurement of the viscosity can be performed using a TVE25L viscometer manufactured by Toki Sangyo Co., Ltd., by reading the viscosity at 50 rpm under an atmosphere at 25° C.

From the viewpoint of the balance between the discharge stability and the dot formation reliability following impact, the surface tension at 25° C. is preferably at least 20 mN/m but not more than 50 mN/m, and is more preferably at least 25 mN/m but not more than 40 mN/m. Measurement of the surface tension can be performed using an automatic surface tensiometer CBVP-Z manufactured by Kyowa Interface Science Co., Ltd., by determining the surface tension when a platinum plate is wetted with the ink under an atmosphere at 25° C.

<Ink Production Method>

The ink according to an embodiment of the present invention can be produced by any of various methods known in the technical field, and specifically, can be produced in the following manner. First, the individual or mixed organic solvent and/or the polymerizable monomer, the pigment and the pigment dispersant and the like are mixed together, and a paint shaker, sand mill, roll mill, or media-less dispersion device or the like is used to disperse the pigment and prepare a pigment dispersion. The remainder of the organic solvent and/or the polymerizable monomer, a binder resin, the photopolymerization initiator, and any other additives (such as a surface modifier or polymerization inhibitor) are then added to the obtained pigment dispersion to achieve the desired ink characteristics, thus completing the ink.

The pigment dispersion preferably contains the pigment in an amount of 3 to 50% by mass, more preferably 5 to 40% by mass, and even more preferably 10 to 30% by mass, relative to the total mass of the pigment dispersion.

When the magenta ink of an embodiment of the present invention is used as an active energy ray-curable ink, the production method includes:

a pigment dispersion step of subjecting a mixed liquid containing 10 to 50% by mass of at least one pigment selected from the group consisting of C.I. Pigment Red 147, 150, 176, 266 and 269 as the magenta pigment, and the pigment dispersant and/or the polymerizable monomer to a pigment dispersion treatment to produce a pigment dispersion, and an ink formation step of mixing the pigment dispersion and a liquid containing at least the polymerizable monomer and the polymerization initiator to produce an active energy ray-curable inkjet ink in which the amount of the at least one pigment selected from the group consisting of C.I. Pigment Red 147, 150, 176, 266 and 269 represents 1 to 10% by mass of the total mass of the ink.

In the production of the above active energy ray-curable ink, a monofunctional (meth)acrylate monomer or a difunctional (meth)acrylate is preferred as the dispersion solvent medium.

In terms of the stability and viscosity of the ink, the ink preferably contains a polymerizable monomer having an EO/PO skeleton. Among the various possibilities, in terms of stability, the ink preferably contains at least one monomer selected from the group consisting of 2-phenoxyethyl acrylate, dipropylene glycol diacrylate and 2-(2-hydroxyethoxy) ethyl acrylate, and more preferably contains either 2-phenoxyethyl acrylate or dipropylene glycol diacrylate.

Moreover, other embodiments of the present invention relate to an inkjet recording method that uses the magenta ink of an embodiment of the present invention or an ink set containing the magenta ink, and to a printed item recorded using the inkjet recording method.

<Inkjet Recording Method>

This embodiment can be used favorably for single-pass inkjet printing in which inks are discharged from at least two inkjet heads, and the inks are then cured simultaneously. Single-pass inkjet printing is a printing method in which a single inkjet head performs printing once.

Printers are generally of either a type in which UV irradiation is performed between heads to fix the inks (pin/cure type), or a type in which the inks are cured simultaneously without fixing (pin/cure-less type). In this embodiment, high-quality printed items can be obtained even with a pin/cure-less type printer, without using a pin/cure type printer.

In single-pass inkjet printing, the printing speed is preferably at least 35 m/minute, and more preferably 50 in/minute or greater. The resolution of single-pass inkjet printing of an embodiment is preferably at least 180 dpi, more preferably at least 300 dpi, and even more preferably 600 dpi or greater.

An active energy ray-curable inkjet recording method according to an embodiment of the present invention includes (1) a step of discharging either a magenta ink according to an embodiment of the present invention or an ink contained in an ink set containing the magenta ink from an inkjet head onto a recording medium, and (2) a step of curing the discharged ink by irradiation with active energy rays. By including both of these steps (1) and (2), a printed item composed of a cured color image on a recording medium can be obtained.

In the inkjet recording method of this embodiment, there are no particular limitations on the order in which each of the color inks is discharged. For example, in the case of an ink set composed of yellow, magenta, cyan and black inks, in the case of single-pass printing, it is preferable that the inks are either supplied to the recording medium simultaneously, or supplied to the recording medium in an order represented by yellow →magenta →cyan →black.

Further, in the case where a white ink is added to the above ink set, the inks are preferably supplied to the recording medium in an order represented by white →yellow →magenta →cyan →black. Moreover, when a special color ink such as an orange or violet ink is included, the discharge order is preferably altered in accordance with the desired color reproducibility.

<Inkjet Ink Curing Method>

There are no particular limitations on the active energy rays used for curing the ink, provided they affect the electron orbitals of the body being irradiated and induce a radical, cationic, or anionic or the like polymerization reaction. Examples of the active energy rays include electron beams, ultraviolet rays and infrared rays. In embodiments of the invention, ultraviolet rays can be used favorably.

Examples of sources that can be used as the light source for the ultraviolet rays include high-pressure mercury lamps, metal halide lamps, low-pressure mercury lamps, ultra-high-pressure mercury lamps, ultraviolet lasers, LEDs and sunlight. In terms of convenience and price, the use of a high-pressure mercury lamp, metal halide lamp, or LED or the like having an emission maximum wavelength of 300 nm to 400 urn is preferred.

<Recording Medium>

The recording medium may be selected as desired, and any of the various types of recording media known in the technical field can be used. Examples of film substrates that can be used favorably include PET substrates, PE substrates, PP substrates, PVC substrates, and polycarbonate substrates and the like. A coated paper is preferred as a paper substrate. A specific example of a PET substrate is PET50 K2411 manufactured by Lintec Corporation.

The present invention also relates to the items described below.

(1) A magenta ink for non-aqueous inkjet recording, containing at least one pigment selected from the group consisting of C.I. Pigment Red 147, 150, 176, 266 and 269.
(2) The magenta ink for non-aqueous inkjet recording disclosed above in (1), wherein the amount of the pigment contained in the magenta ink is from 1 to 10% by mass.
(3) The magenta ink for non-aqueous inkjet recording disclosed above in (1) of (2), further containing a polymerizable monomer and an initiator.
(4) An ink set for non-aqueous inkjet recording, containing at least a yellow ink, a cyan ink and a magenta ink, wherein the magenta ink is the magenta ink for non-aqueous inkjet recording disclosed above in any one of (1) to (3).
(5) The ink set for non-aqueous inkjet recording disclosed above in (4), further containing an orange ink and/or a violet ink.
(6) The ink set for non-aqueous inkjet recording disclosed above in (4) or (5), wherein the inks are active energy ray-curable inks.
(7) A recorded item obtained using the ink set for non-aqueous inkjet recording disclosed above in any one of (4) to (6).

This Application is related to the subject matter disclosed in prior Japanese Application 2015-072695 filed on Mar. 31, 2015, the entire contents of which are incorporated by reference herein.

EXAMPLES

The present invention is described below in further detail, but the examples described below in no way limit the scope of rights of the present invention. In the examples "parts" represents "parts by mass".

1. Preparation of Inks (Magenta Inks M1 to M13, M19 to M22 and M24, Yellow Inks Y1 to Y4, Cyan Inks C1 and C2, Orange Ink O1, and Violet Ink V1)

Prior to preparing the inks, pigment dispersions were produced. Each of the pigment dispersions was produced by mixing 20 parts by mass of a pigment, 4 parts by mass of a pigment dispersant (SOLSPERSE 32000 manufactured by The Lubrizol Corporation) and 76 parts by mass of DPGDA in a high-speed mixer or the like until a uniform mixture was obtained, and then further dispersing the thus obtained mill base for about one hour in a horizontal sand mill to complete preparation of the pigment dispersion.

Polymerizable monomers, photopolymerization initiators, a polymerization inhibitor, a surface modifier and an organic solvent were added sequentially under constant stirring to the prepared pigment dispersion so as to obtain the formulation shown in Table 1 or 2, and the resulting mixture was mixed gently until the photopolymerization initiators dissolved. The blend amounts of DPGDA shown in Tables 1 and 2 are numerical values that include the amount of DPGDA in the pigment dispersion. Subsequently, the mixture was filtered through a membrane filter with a pore diameter of 1 μm to remove coarse particles, thus obtaining an inkjet ink for evaluation purposes. The addition and mixing of the various raw materials to obtain the above mixture may be performed in any particular order.

2. Preparation of Inks (Magenta Inks M14 to M18 and M23, Yellow Ink Y5, and Cyan Ink C3)

Prior to preparing the inks, pigment dispersions were produced. Each of the pigment dispersions was produced by mixing 15 parts by mass of a pigment, 22.5 parts by mass of a pigment dispersant (EFKA 7701 manufactured by BASF Corporation) and 62.5 parts by mass of DPGDA in a high-speed mixer or the like until a uniform mixture was obtained, and then further dispersing the thus obtained mill base for about one hour in a horizontal sand mill to complete preparation of the pigment dispersion. Ink preparation was then performed using the same method as that described above.

Details of the materials used in each of the test examples are as follows.

Magenta pigments: P.R. 266 (C.I. Pigment Red 266), P.R. 269 (C.I. Pigment Red 269), P.R. 147 (C.I. Pigment Red 147), P.R. 150 (C.I. Pigment Red 150), P.R. 176 (C.I. Pigment Red 176), P.R. 122 (C.I. Pigment Red 122), P.V. 19 (C.I. Pigment Violet 19), P.R. 81:2 (C.I. Pigment Red 81:2), P.R. 48:1 (C.I. Pigment Red 48:1)

Yellow pigments: P.Y. 180 (C.I. Pigment Yellow 180), P.Y. 185 (C.I. Pigment Yellow 185), P.Y. 150 (C.I. Pigment Yellow 150), P.Y. 151 (C.I. Pigment Yellow 151)

Cyan pigments: P.B. 15:3 (C.I. Pigment Blue 15:3), P.B. 15:4 (C.I. Pigment Blue 15:4)

Orange pigment: P.O. 64 (C.I. Pigment Orange 64)

Violet pigment: P. V. 23 (C.I. Pigment Violet 23)

SP32000: a polyethyleneimine-based basic pigment dispersing resin (SOLSPERSE 32000 manufactured by The Lubrizol Corporation, Mw =25,000, acid value: 12, amine value: 22)

EFKA7701: an acrylic block copolymer basic dispersant (EFKA 7701 manufactured by BASF Corporation, Mw =22,000, amine value: 40)

PEA: 2-phenoxyethyl acrylate (VISCOAT #192 manufactured by Osaka Organic Chemical Industry Ltd.)

LA: lauryl acrylate: (lauryl acrylate manufactured by Osaka Organic Chemical Industry Ltd.)

DPGDA: dipropylene glycol diacrylate (Miramer M222 manufactured by BASF Corporation)

VEEA: 2-(2-vinyloxyethoxy)ethyl acrylate (VEEA-AI manufactured by Nippon Shokubai Co., Ltd.)

Irg127: 2-hydroxy-1-{4-[4-(2-hydroxy-2-methylpropionyl)-benzyl]-phenyl}-2-methylpropan-1-o ne (IRGACURE 127 manufactured by BASF Corporation)

BMS: 4-benzoyl-4'-methyl-diphenyl sulfide (KAYACURE BMS manufactured by Nippon Kayaku Co., Ltd.)

EDB: ethyl-4-(dimethylamino)benzoate (SB-PI-704 manufactured by Sort Co., Ltd.)

TPO: 2,4,6-trimethylbenzoyl-diphenylphosohine oxide (IRGACURE TPO manufactured by BASF Corporation)

DEDG: diethylene glycol diethyl ether (DEDG manufactured by Nippon Nyukazai Co., Ltd.)

Phenothiazine: (phenothiazine manufactured by Seiko Chemical Co., Ltd.)

BYK-UV3510: a polyether-modified polydimethylsiloxane (BYK-UV 3510 manufactured by BYK-Chemie GmbH)

Evaluation 1: Ink Storage Stability

The ink was used to fill a sealable storage vial to 90% capacity, and the vial was stored for 2 weeks at 60° C. The change in viscosity from before storage to after storage was evaluated against the evaluation criteria below to evaluate the storage stability. The evaluation results are shown in Table 1. Evaluation results of AA, A and B can be deemed good results.

AA: change in viscosity of less than 5% relative to the initial value

A: change in viscosity of at least 5% but less than 10% relative to the initial value B: change in viscosity of at least 10% but less than 20% relative to the initial value C: change in viscosity of 20% or more relative to the initial value Evaluation 2: Ink Discharge Stability Using an inkjet discharge apparatus (OnePass JET manufactured by Tritek Co., Ltd.) fitted with a Kyocera head (resolution: 600 dpi×600 dpi), a nozzle check pattern was printed using the prepared ink under printing conditions including an ink droplet volume of 14 pl. After 100,000 discharges, a second nozzle check pattern was printed, and the discharge stability was evaluated based on the number of blocked nozzles. The evaluation criteria are shown below, with an evaluation of B or higher deemed to indicate good discharge stability.

AA: no blocked nozzles after 100,000 discharges

A: 1 or 2 blocked nozzles after 100,000 discharges

B: 3 to 5 blocked nozzles after 100,000 discharges

C: 6 or more blocked nozzles after 100,000 discharges

Evaluation 3: Ink Adhesion

Printing was performed using the prepared inks. The printing conditions were as follows.

Using an inkjet discharge apparatus (OnePass JET manufactured by Tritek Co., Ltd.) fitted with a Kyocera head (resolution: 600 dpi×600 dpi), a 100% solid image was printed onto a PET K2411 substrate manufactured by Lintec Corporation under printing conditions including an ink droplet volume of 14 pl. The film thickness of each ink film was about 8 μm.

Subsequently, using a conveyor speed of 50 m/min and using a 160 W/cm metal halide lamp (365 nm) manufactured by Harison Toshiba Lighting Corporation as a light source, the ink was cured in the open atmosphere to obtain an inkjet printed item.

Six vertical and 6 horizontal cuts were then made in the printed portion in a chessboard-like pattern with a spacing of 2.5 mm between adjacent cuts. A cellophane tape was then stuck to the printed portion in which the cuts had been formed, and the upper surface of the cellophane tape was then rubbed with an eraser to ensure good adhesion of the cellophane tape to the coated surface. The cellophane tape was then peeled off at an angle of 90°, and the ink adhesion was evaluated on the basis of the peeled surface area of the magenta printed portion following peeling. The evaluation criteria are shown below, with an evaluation of B or higher deemed to indicate good adhesion.

AA: tape-peeled surface area of less than 5%

A: tape-peeled surface area of at least 5% but less than 15%

B: tape-peeled surface area of at least 15% but less than 25%

C: tape-peeled surface area of 25% or more

Evaluation 4: Curing Wrinkles Evaluation

Using the prepared magenta, yellow, cyan, orange and violet inks, printing was performed under the same printing conditions as those described for Evaluation 3.

A visual evaluation was then performed in accordance with the following criteria. Evaluation results of A to C are deemed suitable for practical application, and A and B results are deemed to indicate good curing wrinkle suppression.

A: no curing wrinkles, good gloss

B: surface area in which curing wrinkles are visible is less than 10% of cured film C: surface area in which curing wrinkles are visible is at least 10% but less than 20% of cured film D: surface area in which curing wrinkles are visible is 20% or more of cured film Evaluation 5: Ink Set Light Resistance Using a prepared ink set, ink set printing was performed using magenta, yellow, cyan, orange and violet inks, as shown in Table 3. The printing conditions were as follows.

Using an inkjet discharge apparatus (OnePass JET manufactured by Tritek Co., Ltd.) fitted with a Kyocera head (resolution: 600 dpi×600 dpi), a 100% solid image of each color was printed onto a PET K2411 substrate manufactured by Lintec Corporation under printing conditions including an ink droplet volume of 14 pl. The film thickness of the ink film of each color was about 8 μm.

Subsequently, using a conveyor speed of 50 m/min and using a 160 W/cm metal halide lamp (365 nm) manufactured by Harison Toshiba Lighting Corporation as a light source, the inks were cured in the open atmosphere to obtain an inkjet printed item.

The thus prepared printed items were exposed for 400 hours or 600 hours at an irradiation dose of 70,000 Lux using a Xenon Weather Meter XL75 manufactured by Suga Test Instruments Co., Ltd., and the OD value of each color was then measured. The reduction in the OD value following exposure relative to the OD value prior to exposure was determined, and the light resistance of the printed sample was evaluated for each color based on the evaluation criteria described below. The largest reduction in the OD value was evaluated against the grades A to C below. The results are shown in the light resistance column of Table 3. Evaluation results of A and B are deemed to indicate good light resistance.

A: reduction in OD value of less than 20%

B: reduction in OD value of at least 20% but less than 30%

C: reduction in OD value of 30% or more

Evaluation 6: Ink Set Color Development (Chroma)

Of the various ink sets shown in Table 3, using either the magenta ink by itself, or a combination of the magenta ink and the yellow ink, the magenta ink and the cyan ink, the magenta ink and the orange ink, or the magenta ink and the violet ink, printing was either performed using the magenta ink as a lone ink, or by secondary color step chart printing. Step chart printing produces an image in which the two colors are superimposed while the coverage rate of each ink is varied within a range from 0 to 100% in steps of 5%.

Using an X-Rite 500 series device manufactured by X-Rite, Inc., the a* and b* indices for the thus obtained printed items were measured at 5 random locations under conditions including a viewing angle of 2°, a light source D65 and the CIE color space, and the average value was determined for each index. The value of C* was then determined using the formula shown below, and evaluation was performed using the largest C* value.

Based on this C* value, the chroma values of each ink set were compared using the evaluation criteria below. The results are shown in the color development columns of Table 3.

$$C^* = [(a^*)^2 + (b^*)^2]^{1/2}$$

The magenta chroma was evaluated against the following criteria for the case where only the magenta ink was used.
A: $C^* \geq 80$
B: $75 \leq C^* < 80$
C: $70 \leq C^* < 75$
D: $70 > C^*$ The red chroma was evaluated against the following criteria using the larger value among the ink set of the magenta ink and the yellow ink, and the ink set of the magenta ink and the orange ink.
A: $C^* \geq 90$
B: $85 \leq C^* < 90$
C: $80 \leq C^* < 85$
D: $80 > C^*$ The violet chroma was evaluated against the following criteria using the larger value among the ink set of the magenta ink and the cyan ink, and the ink set of the magenta ink and the violet ink.
A: $C^* \geq 60$
B: $55 \leq C^* < 60$
C: $50 \leq C^* < 55$
D: $50 > C^*$ Evaluation 7: Ink Set Curing Wrinkles Evaluation The portion of the print samples from the secondary color step charts of Evaluation 6 in which the coverage rate was 100% was inspected visually for curing wrinkles, and evaluation was performed in the same manner as the curing wrinkle evaluations of Evaluation 4.

TABLE 1

|  | M1 | M2 | M3 | M4 | M5 | M6 | M7 | M8 | M9 | M10 | M11 | M12 |
|---|---|---|---|---|---|---|---|---|---|---|---|---|
| Pigment type | P.R.266 | P.R.266 | P.R.266 | P.R.266 | P.R.266 | P.R.266 | P.R.266 | P.R.269 | P.R.147 | P.R.150 | P.R.176 | P.R.266 |
| Blend amount | 1.0 | 3.0 | 5.0 | 7.0 | 3.0 | 3.0 | 3.0 | 3.0 | 3.0 | 3.0 | 3.0 | 3.0 |
| SP32000 | 0.2 | 0.6 | 1.0 | 1.4 | 0.6 | 0.6 | 0.6 | 0.6 | 0.6 | 0.6 | 0.6 | 0.6 |
| EFKA7701 |  |  |  |  |  |  |  |  |  |  |  |  |
| PEA |  |  |  |  | 20.0 | 20.0 | 20.0 | 20.0 | 20.0 | 20.0 | 20.0 |  |
| LA | 30.0 | 30.0 | 30.0 | 24.6 | 5.0 | 5.0 | 5.0 | 5.0 | 5.0 | 5.0 | 5.0 | 5.0 |
| DPGDA | 29.0 | 26.6 | 24.2 | 27.2 | 32.1 | 32.1 | 31.6 | 31.6 | 31.6 | 31.6 | 31.6 | 51.6 |
| VEEA | 30.0 | 30.0 | 30.0 | 30.0 | 30.0 | 30.0 | 30.0 | 30.0 | 30.0 | 30.0 | 30.0 | 30.0 |
| Irg127 |  |  |  |  | 3.0 | 3.0 |  |  |  |  |  |  |
| BMS | 3.0 | 3.0 | 3.0 | 3.0 | 3.0 | 3.0 | 3.0 | 3.0 | 3.0 | 3.0 | 3.0 | 3.0 |
| TPO | 3.0 | 3.0 | 3.0 | 3.0 | 3.0 |  | 3.0 | 3.0 | 3.0 | 3.0 | 3.0 | 3.0 |
| EDB | 3.0 | 3.0 | 3.0 | 3.0 |  | 3.0 | 3.0 | 3.0 | 3.0 | 3.0 | 3.0 | 3.0 |
| DEDG | 0.5 | 0.5 | 0.5 | 0.5 | 0.5 | 0.5 | 0.5 | 0.5 | 0.5 | 0.5 | 0.5 | 0.5 |
| Phenothiazine | 0.1 | 0.1 | 0.1 | 0.1 | 0.1 | 0.1 | 0.1 | 0.1 | 0.1 | 0.1 | 0.1 | 0.1 |
| BYK-UV3510 | 0.2 | 0.2 | 0.2 | 0.2 | 0.2 | 0.2 | 0.2 | 0.2 | 0.2 | 0.2 | 0.2 | 0.2 |
| Total | 100.0 | 100.0 | 100.0 | 100.0 | 100.5 | 100.5 | 100.0 | 100.0 | 100.0 | 100.0 | 100.0 | 100.0 |
| Storage stability | A | A | A | A | A | A | A | B | B | B | B | A |
| Discharge stability | A | A | A | B | A | A | A | B | B | A | B | AA |
| Adhesion | A | A | A | B | B | B | A | B | A | A | B | AA |
| Curing wrinkles | B | B | B | C | C | C | A | A | A | A | B | A |

|  | M13 | M14 | M15 | M16 | M17 | M18 | M19 | M20 | M21 | M22 | M23 | M24 |
|---|---|---|---|---|---|---|---|---|---|---|---|---|
| Pigment type | P.R.266 | P.R.266 | P.R.266 | P.R.266 | P.R.266 | P.R.266 | P.R.266 | P.R.122 | P.V.19 | P.R.81:2 | P.R.81:2 | P.R.48:1 |
| Blend amount | 3.0 | 3.0 | 3.0 | 3.0 | 3.0 | 3.0 | 12.0 | 3.0 | 3.0 | 3.0 | 3.0 | 3.0 |
| SP32000 | 0.6 |  |  |  |  |  | 2.4 | 0.6 | 0.6 | 0.6 |  | 0.6 |
| EFKA7701 |  | 4.5 | 4.5 | 4.5 | 4.5 | 4.5 |  |  |  |  | 4.5 |  |
| PEA |  | 20.0 |  |  |  |  |  | 20.0 | 20.0 | 20.0 | 20.0 | 20.0 |
| LA |  | 5.0 | 15.0 | 5.0 |  | 30.0 |  | 5.0 | 5.0 | 5.0 | 5.0 | 5.0 |
| DPGDA | 56.6 | 27.7 | 37.7 | 47.7 | 52.7 | 22.7 | 45.8 | 31.6 | 31.6 | 31.6 | 27.7 | 31.6 |
| VEEA | 30.0 | 30.0 | 30.0 | 30.0 | 30.0 | 30.0 | 30.0 | 30.0 | 30.0 | 30.0 | 30.0 | 30.0 |
| Irg127 |  |  |  |  |  |  |  |  |  |  |  |  |
| BMS | 3.0 | 3.0 | 3.0 | 3.0 | 3.0 | 3.0 | 3.0 | 3.0 | 3.0 | 3.0 | 3.0 | 3.0 |
| TPO | 3.0 | 3.0 | 3.0 | 3.0 | 3.0 | 3.0 | 3.0 | 3.0 | 3.0 | 3.0 | 3.0 | 3.0 |
| EDB | 3.0 | 3.0 | 3.0 | 3.0 | 3.0 | 3.0 | 3.0 | 3.0 | 3.0 | 3.0 | 3.0 | 3.0 |
| DEDG | 0.5 | 0.5 | 0.5 | 0.5 | 0.5 | 0.5 | 0.5 | 0.5 | 0.5 | 0.5 | 0.5 | 0.5 |
| Phenothiazine | 0.1 | 0.1 | 0.1 | 0.1 | 0.1 | 0.1 | 0.1 | 0.1 | 0.1 | 0.1 | 0.1 | 0.1 |
| BYK-UV3510 | 0.2 | 0.2 | 0.2 | 0.2 | 0.9 | 0.2 | 0.2 | 0.2 | 0.2 | 0.2 | 0.2 | 0.2 |
| Total | 100.0 | 100.0 | 100.0 | 100.0 | 100.0 | 100.0 | 100.0 | 100.0 | 100.0 | 100.0 | 100.0 | 100.0 |
| Storage stability | A | AA | AA | AA | AA | A | C | B | B | B | B | B |
| Discharge stability | AA | AA | AA | AA | AA | A | C | A | B | C | D | D |
| Adhesion | AA | A | A | AA | AA | A | C | B | B | C | C | C |
| Curing wrinkles | A | A | A | A | A | B | D | A | A | B | B | B |

TABLE 2

|  | Y1 | Y2 | Y3 | Y4 | Y5 | C1 | C2 | C3 | O1 | V1 |
| --- | --- | --- | --- | --- | --- | --- | --- | --- | --- | --- |
| Pigment type | P.Y.180 | P.Y.185 | P.Y.150 | P.Y.151 | P.Y.180 | P.B.15:3 | P.B.15:4 | P.B.15:3 | P.O.64 | P.V.23 |
| Blend amount | 3.0 | 3.0 | 3.0 | 3.0 | 3.0 | 3.0 | 3.0 | 3.0 | 3.0 | 3.0 |
| SP32000 | 0.6 | 0.6 | 0.6 | 0.6 |  | 0.6 | 0.6 |  | 0.6 | 0.6 |
| EFKA7701 |  |  |  |  | 4.5 |  |  | 4.5 |  |  |
| PEA | 20.0 | 20.0 | 20.0 | 20.0 |  | 20.0 | 20.0 |  | 20.0 | 20.0 |
| LA | 5.0 | 5.0 | 5.0 | 5.0 | 5.0 | 5.0 | 5.0 | 5.0 | 5.0 | 5.0 |
| DPGDA | 31.6 | 31.6 | 31.6 | 31.6 | 47.7 | 31.6 | 31.6 | 47.7 | 31.6 | 31.6 |
| VEEA | 30.0 | 30.0 | 30.0 | 30.0 | 30.0 | 30.0 | 30.0 | 30.0 | 30.0 | 30.0 |
| Irg127 |  |  |  |  |  |  |  |  |  |  |
| BMS | 3.0 | 3.0 | 3.0 | 3.0 | 3.0 | 3.0 | 3.0 | 3.0 | 3.0 | 3.0 |
| TPO | 3.0 | 3.0 | 3.0 | 3.0 | 3.0 | 3.0 | 3.0 | 3.0 | 3.0 | 3.0 |
| EDB | 3.0 | 3.0 | 3.0 | 3.0 | 3.0 | 3.0 | 3.0 | 3.0 | 3.0 | 3.0 |
| DEDG | 0.5 | 0.5 | 0.5 | 0.5 | 0.5 | 0.5 | 0.5 | 0.5 | 0.5 | 0.5 |
| Phenothiazine | 0.1 | 0.1 | 0.1 | 0.1 | 0.1 | 0.1 | 0.1 | 0.1 | 0.1 | 0.1 |
| BYK-UV3510 | 0.2 | 0.2 | 0.2 | 0.2 | 0.2 | 0.2 | 0.2 | 0.2 | 0.2 | 0.2 |
| Total | 100.0 | 100.0 | 100.0 | 100.0 | 100.0 | 100.0 | 100.0 | 100.0 | 100.0 | 100.0 |
| Storage stability | A | A | A | A | AA | AA | AA | AA | A | A |
| Discharge stability | A | A | A | A | AA | A | A | AA | A | A |
| Adhesion | A | A | A | A | AA | A | A | AA | A | A |
| Curing wrinkles | A | A | A | A | A | A | A | A | A | A |

TABLE 3

|  |  |  |  |  |  | Light resistance | | Color development | | | Secondary color |
| --- | --- | --- | --- | --- | --- | --- | --- | --- | --- | --- | --- |
|  | Magenta | Yellow | Cyan | Orange | Violet | 400 hours | 600 hours | Magenta | Red | Violet | curing wrinkles |
| Example 1 | M1 | Y1 | C1 |  |  | A | A | B | B | B | B |
| Example 2 | M2 | Y1 | C1 |  |  | A | A | B | B | B | B |
| Example 3 | M3 | Y1 | C1 |  |  | A | A | B | B | B | B |
| Example 4 | M4 | Y1 | C1 |  |  | A | A | B | B | B | B |
| Example 5 | M5 | Y1 | C1 |  |  | A | A | B | B | B | C |
| Example 6 | M6 | Y1 | C1 |  |  | A | A | B | B | B | C |
| Example 7 | M7 | Y1 | C1 |  |  | A | A | A | A | A | A |
| Example 8 | M8 | Y1 | C1 |  |  | A | B | A | B | B | A |
| Example 9 | M9 | Y1 | C1 |  |  | A | B | A | B | B | A |
| Example 10 | M10 | Y1 | C1 |  |  | B | B | A | B | B | A |
| Example 11 | M11 | Y1 | C1 |  |  | A | A | B | B | C | B |
| Example 12 | M7 | Y2 | C1 |  |  | A | A | A | A | A | A |
| Example 13 | M7 | Y3 | C1 |  |  | A | A | A | B | B | A |
| Example 14 | M7 | Y4 | C1 |  |  | A | B | A | B | B | A |
| Example 15 | M7 | Y1 | C2 |  |  | A | A | A | A | A | A |
| Example 16 | M2 | Y1 | C1 | O1 |  | A | A | B | A | B | A |
| Example 17 | M2 | Y1 | C1 |  | V1 | A | A | B | B | A | A |
| Example 18 | M2 | Y1 | C1 | O1 | V1 | A | A | B | A | A | A |
| Example 19 | M12 | Y1 | C1 |  |  | A | A | A | A | A | B |
| Example 20 | M13 | Y1 | C1 |  |  | A | A | A | A | A | B |
| Example 21 | M14 | Y1 | C1 |  |  | A | A | A | A | A | A |
| Example 22 | M15 | Y1 | C1 |  |  | A | A | A | A | A | B |
| Example 23 | M16 | Y1 | C1 |  |  | A | A | A | A | A | B |
| Example 24 | M17 | Y1 | C1 |  |  | A | A | A | A | A | B |
| Example 25 | M18 | Y1 | C1 |  |  | A | A | B | B | B | B |
| Example 26 | M16 | Y5 | C3 |  |  | A | A | A | A | A | A |
| Example 27 | M17 | Y5 | C3 |  |  | A | A | A | A | A | A |
| Example 28 | M17 | Y5 | C1 |  |  | A | A | A | A | A | B |
| Example 29 | M17 | Y1 | C3 |  |  | A | A | A | A | A | B |
| Comparative Example 1 | M19 | Y1 | C1 |  |  | C | C | B | B | B | D |
| Comparative Example 2 | M20 | Y1 | C1 |  |  | A | A | C | D | A | B |
| Comparative Example 3 | M21 | Y1 | C1 |  |  | A | A | C | D | C | B |
| Comparative Example 4 | M22 | Y1 | C1 |  |  | C | C | C | D | C | B |
| Comparative Example 5 | M23 | Y1 | C1 |  |  | C | D | C | C | C | B |
| Comparative Example 6 | M24 | Y1 | C1 |  |  | C | D | C | C | C | B |

Based on the above evaluation results, it is evident that from the viewpoints of light resistance, color development and storage stability, the magenta ink according to an embodiment of the present invention is comprehensively superior to the comparative examples that used conventional quinacridone pigments. Further, it is also evident that among the examples of the present invention, the magenta ink that used the C.I. Pigment Red 266 was particularly superior overall.

Based on a comparison of Example 2 with Examples 7, 19 and 20, and a comparison of Example 25 with Examples 21 to 24, it was evident that when an inkjet ink of the present invention was used as an active energy ray-curable ink, using a polymerizable monomer having an EO/PO skeleton as a polymerizable monomer, in an amount of 70 to 100% by mass relative to the total mass of all the polymerizable monomers, yielded better suppression of curing wrinkles, and resulted in superior color development.

Based on a comparison of the magenta inks M7, M12 and M13, it was evident that when the amount of monofunctional monomers was not more than 20% by mass relative to the total mass of monomers, the discharge stability was better, and the curability and substrate adhesion were also improved.

Comparisons of the magenta inks M7 and M14, M12 and M16, and M13 and M17 respectively revealed that when C.I. Pigment Red 266 was used as the magenta pigment, use of an acrylic-based block copolymer basic dispersant as the pigment dispersant yielded superior ink stability.

Based on a comparison of Example 2 with Examples 16 to 18, it was evident that when the magenta ink of the present invention was used to form an ink set with not only a yellow ink and a cyan ink, but also an orange ink and/or violet ink, even better color development could be achieved.

The invention claimed is:

1. An active energy ray-curable magenta ink for non-aqueous inkjet recording, comprising:
    at least one pigment selected from the group consisting of C.I. Pigment Red 147, 150, and 266, in an amount of 0.5 to 10% by mass relative to a total mass of the ink,
    a polymerizable monomer,
    a photopolymerization initiator, and
    a pigment dispersing resin.

2. The active energy ray-curable magenta ink for non-aqueous inkjet recording according to claim 1, wherein the polymerizable monomer comprises at least one monomer selected from the group consisting of monofunctional (meth)acrylates and difunctional (meth)acrylates.

3. The active energy ray-curable magenta ink for non-aqueous inkjet recording according to claim 1, wherein the polymerizable monomer comprises a polymerizable monomer having at least one of an ethylene oxide unit and a propylene oxide unit, in an amount of 70 to 100% by mass relative to a total mass of the polymerizable monomer.

4. An active energy ray-curable ink set for non-aqueous inkjet recording, comprising at least a magenta ink, a yellow ink and a cyan ink, wherein
    the magenta ink is the active energy ray-curable magenta ink for non-aqueous inkjet recording according to claim 1, and
    the yellow ink comprises at least one pigment selected from the group consisting of C.I. Pigment Yellow 150, 151, 180 and 185, in an amount of 1 to 10% by mass relative to a total mass of the yellow ink.

5. The active energy ray-curable ink set for non-aqueous inkjet recording according to claim 4, further comprising at least one of an orange ink and a violet ink.

6. An inkjet recording method which uses the active energy ray-curable magenta ink for non-aqueous inkjet recording according to claim 1, the method comprising:
    a discharge step of discharging the active energy ray-curable magenta ink for non-aqueous inkjet recording from an inkjet head onto a substrate, and
    a step of curing the discharged ink by irradiation with active energy rays.

7. An inkjet recording method which uses the active energy ray-curable ink set for non-aqueous inkjet recording according to claim 4, the method comprising:
    a discharge step of discharging an ink of the active energy ray-curable ink set for non-aqueous inkjet recording from an inkjet head onto a substrate, and
    a step of curing the discharged ink by irradiation with active energy rays.

8. The active energy ray-curable ink set for non-aqueous inkjet recording according to claim 4, further comprising an orange ink,
    wherein the orange ink comprises C.I. Pigment Orange 64.

9. The active energy ray-curable ink set for non-aqueous inkjet recording according to claim 8, wherein the orange ink further comprises a quinacridone pigment.

10. The active energy ray-curable ink set for non-aqueous inkjet recording according to claim 9, wherein the amount of the quinacridone pigment is from 1 to 50% by mass, relative to 100% by mass of all of pigments contained in the orange ink.

11. The active energy ray-curable magenta ink for non-aqueous inkjet recording according to claim 1, wherein the pigment comprises C.I. Pigment Red 266, in the amount of 0.5 to 10% by mass relative to the total mass of the ink.

* * * * *